(12) United States Patent
Badillo

(10) Patent No.: US 12,036,954 B2
(45) Date of Patent: Jul. 16, 2024

(54) MOUNTING SYSTEM FOR A VEHICLE ROOF RACK

(71) Applicant: Paul Badillo, Littleton, CO (US)

(72) Inventor: Paul Badillo, Littleton, CO (US)

(73) Assignee: INTELLIGENT DESIGNS 2000 CORP., Aurora, CO (US)

( * ) Notice: Subject to any disclaimer, the term of this patent is extended or adjusted under 35 U.S.C. 154(b) by 245 days.

(21) Appl. No.: 17/666,298

(22) Filed: Feb. 7, 2022

(65) Prior Publication Data
US 2022/0250551 A1     Aug. 11, 2022

Related U.S. Application Data

(60) Provisional application No. 63/147,094, filed on Feb. 8, 2021.

(51) Int. Cl.
*B60R 9/058*       (2006.01)

(52) U.S. Cl.
CPC .................................... *B60R 9/058* (2013.01)

(58) Field of Classification Search
CPC ........... B60R 9/058; B60R 11/00; B60R 1/04; B60R 9/08
See application file for complete search history.

(56) References Cited

U.S. PATENT DOCUMENTS

| | | | |
|---|---|---|---|
| 3,944,809 A * | 3/1976 | Moore | .................. F21V 17/104 248/300 |
| D294,137 S | 2/1988 | Robson | |
| D299,224 S | 1/1989 | Kammaya | |
| 4,858,803 A * | 8/1989 | Gerber | ..................... B60R 9/058 224/329 |
| 4,877,169 A | 10/1989 | Grim | |
| D306,990 S | 4/1990 | Bott | |
| 4,995,538 A | 2/1991 | Marengo | |
| 5,002,216 A * | 3/1991 | Gerber | ..................... B60R 9/048 296/213 |
| D340,690 S | 10/1993 | Arvidsson | |
| D344,482 S | 2/1994 | Arvidsson | |
| 5,366,128 A | 11/1994 | Grim | |

(Continued)

FOREIGN PATENT DOCUMENTS

| JP | D1455075 | 10/2012 |
|---|---|---|
| JP | D1567410 | 12/2016 |
| JP | D1612352 | 8/2018 |

OTHER PUBLICATIONS

Official Action for U.S. Appl. No. 29/769,910, dated Jan. 18, 2023, 8 pages. Restriction Requirement.

(Continued)

*Primary Examiner* — Brian D Nash
(74) *Attorney, Agent, or Firm* — Sheridan Ross P.C.

(57) ABSTRACT

A system for mounting a roof rack to a vehicle without puncturing a surface of the vehicle is disclosed. The system includes a base plate, a support bracket, a mounting bracket, and a clamp. The system optionally includes a cover plate. The base plate is placed in the gutter of a vehicle roof, and a bottom surface of the support bracket placed on top of the base plate. The clamp is then inserted through the support bracket, and the mounting bracket is then used to secure the clamp, support bracket and base plate. The clamp has a bottom flange which secures under the vehicle's door jamb.

20 Claims, 13 Drawing Sheets

(56) References Cited

U.S. PATENT DOCUMENTS

| | | | | |
|---|---|---|---|---|
| 5,848,743 | A | * | 12/1998 | Derecktor ............... B60R 9/058 224/322 |
| D625,580 | S | | 10/2010 | Giordano |
| D632,158 | S | | 2/2011 | Yang et al. |
| D722,064 | S | | 2/2015 | Zwerner et al. |
| D752,954 | S | | 4/2016 | Lax et al. |
| D777,080 | S | | 1/2017 | Cropley et al. |
| D779,478 | S | | 2/2017 | Justiss et al. |
| 9,592,768 | B2 | * | 3/2017 | Neufeglise ............... B60R 9/045 |
| D790,332 | S | | 6/2017 | Dresser, III |
| 9,751,468 | B1 | * | 9/2017 | Badillo ................... B60R 9/048 |
| D867,262 | S | | 11/2019 | Eriksson et al. |
| D936,458 | S | | 11/2021 | Wu |
| D945,524 | S | | 3/2022 | Jensen |
| D951,852 | S | | 5/2022 | Ackeret et al. |
| D954,629 | S | | 6/2022 | Liu |
| D957,926 | S | | 7/2022 | Bayless et al. |
| D963,461 | S | | 9/2022 | McArthur |
| D965,414 | S | | 10/2022 | Myers |
| D971,813 | S | | 12/2022 | Menegazzo et al. |
| 2010/0084448 | A1 | | 4/2010 | Fjelland et al. |
| 2015/0353023 | A1 | * | 12/2015 | Schierk ................... B60R 9/058 224/331 |
| 2020/0331401 | A1 | | 10/2020 | Yilma et al. |

OTHER PUBLICATIONS

"Gobi Ford F-150 13th Gen Crew Cab Roof Rack Installation Instructions," Intelligent Designs 2000 Corp., 2020, 16 pages.

"Q Towers (Set of Four)," Yakima, publication date unknown, retrieved Aug. 26, 2020 from https://yakima.com/products/q-towers-4-pack, 8 pages.

"Roof rack round bar," Google Images Search Results, Oct. 19, 2020, retrieved from https://www.google.com/search?q=roof+rack+round+bar&tbm=isch&ved=2ahUKEwiwtJzx28HsAhXVnnIEHSH0Bg0Q2-cCegQIABAA, 10 pages.

U.S. Appl. No. 29/769,910, filed Feb. 8, 2021, Badillo.

"Roof rack tower leg," Google Images Search Results, Oct. 19, 2020, retrieved from https://www.google.com/search?q=roof+rack+tower+leg&tbm=isch&ved=2ahUKEwiZoom28HsAhWugXIEHXEk6UQ2-cCegQIABAA, 10 pages.

"Vehicle rack support tower," Google Images Search Results, Oct. 19, 2020, retrieved from https://www.google.com/search?q=vehicle+rack+support+tower&rlz=1c1GCEB_enUS885US885&source=Inms&tbm=isch&sa=X, 14 pages.

"Yakima Q Towers," Yakima, Instruction Manual for Part# 1033432 Rev. H, publication date unknown, 30 pages.

"Yakima, RoundBar SL Adapter to Attach Streamline Towers to RoundBar Crossbars, Set of 4," Amazon.com, Aug. 20, 2009, retrieved from https://www.amazon.com/Yakima-8003536-RoundBar-StreamLine-Adapter/dp/B0171A6IKC/, 8 pages.

"ARB 4x4 Accessories 3722020 Roof Rack Mounting Kit," Amazon.com, Feb. 12, 2016, retrieved from https://www.amazon.com/ARB-Accessories-3722020-Roof-Mounting/dp/B009ETW1ZK/ref=sr_1_120?crid=1Z71NDHLRX6Y, 5 pages.

"Rhino Rack Aluminum Folding Ladder Bracket for The Pioneer Aluminum Folding Ladder (RUFLB)," Amazon.com, Apr. 21, 2018, retrieved from https://www.amazon.com/Rhino-Rack-Aluminium-Folding-Bracket/dp/B07B5XHX1B/ref=sr_1_280?crid=XWYFDCRVBB8F&k, 5 pages.

"Yakima—SkyLine Towers for Roof Rack System for Vehicles With Fixed Points or Tracks, 4 Pack," Amazon.com, Nov. 17, 2009, retrieved from https://www.amazon.com/Yakima-SkyLine-Towers-Roof-Systems/dp/B0171A6CQ2/ref=sr_1_10?crid=1Z71NDHLRX6YYE, 5 pages.

Notice of Allowance for U.S. Appl. No. 29/769,910, dated Apr. 26, 2023, 9 pages.

* cited by examiner

MOUNTING SYSTEM FOR A VEHICLE ROOF RACK

CROSS-REFERENCE TO RELATED APPLICATIONS

This application claims priority and benefits under 35 U.S.C. § 119(e) to U.S. Provisional Patent Application Ser. No. 63/147,094 filed on Feb. 8, 2021, which is incorporated herein in its entirety by reference.

FIELD

Embodiments of the present disclosure are generally related to systems and methods of mounting a roof rack to a vehicle. More specifically, the present disclosure provides a mounting system and a mount to connect a roof rack to a vehicle.

BACKGROUND

Roof mounted storage racks are known and are used to increase the storage capacity for vehicles as well as to mount certain accessories, such as lights. Traditional roof racks are installed by drilling holes into the roof of the vehicle to attach bolts and screws to the roof or frame of the vehicle.

Drilling into the roof of a vehicle can reduce the durability of the roof and lower the resale value of the vehicle. By breaking the paint of the vehicle, drilled holes expose surfaces to air and water which leads to rust and decay of the exposed metal. The holes can provide a path for water to seep into the roof of the vehicle and cause mold and mildew to form in the cavity between the vehicle exterior roof and ceiling of the cabin. Additionally, the holes detract from the appearance of the vehicle when the roof rack is removed.

Accordingly, there is a need for systems and methods of mounting a roof rack to a vehicle that does not require creating holes in the vehicle.

SUMMARY

In one aspect of the disclosure, a mounting system is provided to interconnect a roof rack to a vehicle. The mounting system is configured to engage a door jamb of the vehicle. The mounting system engages the vehicle without creating holes in the vehicle. The rack is interconnected to the mounting system.

In one embodiment, the mounting system includes four mounts that each engage the vehicle. The mounts work in conjunction to support the roof rack. The roof rack then provides stability to the four mounts so that the mounting system cannot be removed unless disassembled by the user.

In one embodiment of the mounting system, the mounts include a base plate, a support bracket, a clamp, and a mounting bracket.

In use, the base plate is positioned on a portion of a roof of the vehicle, such as within a gutter or other depression in the roof. The base plate is configured to rest in the gutter of a vehicle roof and provide a surface to support the other components of the mount.

The base plate includes one or more holes for fasteners. In one embodiment, the holes are threaded.

The base plate may be a single piece of material or may be multiple pieces of material, such as a piece of metal coated with a composite material. The base plate may comprise a metal, a plastic or a rubber. Further, some embodiments of the base plate may have a protective coating on the surface contacting the vehicle to prevent marring the vehicle surface.

The support bracket has at least three sections of material, including a bottom portion, a bracket wall, and a top portion. The bottom portion is configured to interconnect to the base plate and includes a cutout.

The bracket wall extends from the bottom portion to the top portion. The bracket wall has a bracket slot at the junction with the bottom portion. The bracket slot is generally rectangular and is formed approximately in the middle of the junction of the bracket wall and the bottom portion. While the present embodiment describes the bracket slot as being in the center of the support bracket, the bracket slot could be closer to the left or right edge of the bracket wall.

The top portion extends away from the bracket wall. In one embodiment, the top portion is approximately parallel to the bottom portion. Alternatively, the top portion is oriented at an angle of less than approximately 10°, or about 6° relative to the bottom portion.

The support bracket may have holes or apertures for fasteners in all three sections. The apertures may be elongated. The bottom portion may have at least two apertures to accommodate bolts or other fasteners. The bottom apertures are positioned to align with the holes in the base plate.

The bracket wall may have three apertures. In one embodiment, two front apertures are positioned proximate to the left and right edges of the bracket wall. Additionally, or alternatively, a third front aperture is aligned with the center of the bracket slot.

The top portion may have apertures to accommodate bolts or other fasteners to secure the roof rack to the top portion. While the embodiment shown uses bolts, other methods of attachment, such as screws, adhesives, magnets, and welding are contemplated.

In one embodiment, the support bracket further includes a support brace. The support brace is generally rectangular and extends from the bottom portion, opposite the bracket wall junction, to the top portion, opposite the bracket wall junction. The support brace is configured to provide a supporting force to the top portion to prevent bending under the weight of the roof rack.

The support bracket may be monolithic or made of separate pieces of materials that have been connected. The connected pieces may be connected by welding, adhesives, magnets, or other suitable attachment methods. The support bracket may be metal, plastic, composite, wood, or other suitable materials.

In one embodiment, the mounting bracket is generally planar and is generally rectangular. In some embodiments, the mounting bracket has a first long side, a second long side opposite the first long side, and two ends extending from the first long side to the second long side.

The mounting bracket includes a slot. The slot may be formed near the center of the mounting bracket. The slot is elongated and is generally rectangular.

The mounting bracket also includes a bolt hole. In one embodiment, the mounting bracket has two bolt holes positioned on opposite ends of the slot. In one embodiment, the bolt hole is elongated to define a bolt slot. The bolt slot has a longitudinal axis that is oriented approximately perpendicular to the first long side of the mounting bracket.

Further, in one embodiment, a portion of the second long side of the mounting bracket is removed to define a notch between the bolt holes.

The slot of the mounting bracket slot has a slot width. The slot width is optionally approximately equal to a width of the cutout of the support bracket. Preferably, the bolt holes of the mounting bracket are spaced apart by approximately the same distance as the threaded holes of the base plate and the bottom apertures formed through the bottom portion of the support bracket. The mounting bracket may be formed of metal, plastic, polymer, carbon fiber, wood, or similar material.

In one embodiment, the clamp comprises four separate sections. Optionally, each section is generally planar. In one embodiment, one or more of the sections is approximately rectangular.

The first section is a screw flange which may also be referred to as a first flange. The first flange has a free end extending away from a connection with the second section of the clamp.

The second section is an insert portion of the clamp. The insert portion is connected to the first flange such that the sections intersect at a first angle. The first angle is preferably oblique and optionally greater than approximately 90 degrees. In one embodiment, the first angle is between approximately 70 degrees and approximately 110 degrees.

The insert portion is connected to the body portion opposite the first flange. The body portion connects to the clamp insert portion at a second angle. Optionally, the second angle is greater than 90 degrees. In one embodiment, the second angle is between 110 degrees and approximately 160 degrees.

The fourth section of the clamp is a door jamb flange which is also referred to as a second flange or hook. The second flange intersects the clamp body portion at a third angle. In one embodiment, the third angle is acute such that a free end of the second flange extends over the body portion in a similar direction of the insert portion. Optionally, the third angle is between approximately 60 degrees and approximately 90 degrees, or about 75 degrees.

In one embodiment, the clamp is formed of a single piece of material. However, the clamp may be made of separate pieces that have been connected. The clamp is preferably made from a single sheet of metal that has been bent to the desired configuration, but may also be made from wood, plastic, carbon fiber, or other suitable materials. Additionally, the clamp may have a safety coating made of soft material, such as rubber or polymer, to prevent damage to the door jamb surface and other vehicle surfaces.

In one embodiment, the clamp is made from a sheet of material of uniform thickness. The insert portion and the first flange are configured to extend into the cutout in the support bracket bottom portion. The first flange is also configured to extend through the slot of the mounting bracket. Accordingly, in one embodiment, the first flange has a width that is less than the width of the slot of the mounting bracket.

A further optional component of the mount of the mounting system is a cover plate. The cover plate generally includes a bend separating a top section and a bottom section. In one embodiment, the top section of the cover plate has a first width that is greater than a second width of the bottom section. The top section may include an aperture to receive a fastener extending from the bracket wall of the support bracket. Optionally, the top section also has a cutout which may be semicircular.

One aspect of the present disclosure is a method of interconnecting a roof rack to a vehicle. The method generally includes positioning a base plate within a gutter of the roof of the vehicle. A bottom portion of a support bracket is then placed on the base plate. Bottom apertures formed through the bottom portion of the support bracket are then aligned with threaded holes of the base plate.

A clamp is then positioned with a first flange inserted through a bracket slot of the support bracket. In this position, the clamp is oriented so that a free end of the first flange is directed upwards. A second flange of the clamp is situated to rest underneath the door jamb of the vehicle.

A mounting bracket is then placed over the support bracket bottom portion. Bolt holes of the mounting bracket are aligned with the bottom apertures of the support bracket.

The first flange of the clamp is inserted through a slot of the mounting bracket. The mounting bracket and support bracket are then secured to the base plate by a bolt. In this position, the clamp is secured from being removed from the support bracket's bracket slot by the mounting bracket.

In some embodiments, a cover plate is attached to the bracket wall over the clamp. In one embodiment, the cover plate includes an aperture for a bolt to attach the cover plate to the bracket wall. The cover plate extends downward and a bend in the cover plate causes a bottom section of the cover plate to contact the clamp body portion. When the bolt is tightened, the bottom section of the cover plate creates a biasing force against the clamp body portion. This force provides additional resistance to prevent the second flange from disengaging from the door jamb of the vehicle.

In one embodiment, a screw is inserted into a front aperture of the bracket wall. The screw has a length sufficient to contact a portion of the first flange of the clamp. The contact between the screw and the first flange prevents unintended movement of the clamp. In one embodiment, the first flange has an aperture to receive an end of the screw.

One aspect of the disclosure is a mounting system for attaching a vehicle roof rack to a vehicle, comprising: (1) a base plate; (2) a support bracket; (3) a mounting bracket; and (4) a clamp. The base plate has a first aperture for a first fastener. In one embodiment, the first aperture is threaded.

The support bracket has a bottom portion, a top portion, and a bracket wall extending between the bottom portion and the top portion. The bottom portion has a second aperture for the first fastener and includes a cutout. The top portion has a third aperture for a fastener to interconnect to the roof rack. In one embodiment, the top portion is approximately parallel to the bottom portion. Alternatively, in some embodiments, the top portion is oriented at an angle of less than approximately 10°, or about 6° relative to the bottom portion.

The bracket wall has a fourth aperture. In one embodiment, the fourth aperture is approximately centered between a first lateral edge and a second lateral edge of the bracket wall. Optionally, the fourth aperture is threaded.

The mounting bracket has a slot that extends approximately parallel to a first side. A projection extends from a bottom surface of the mounting bracket. In one embodiment, the projection is approximately parallel to the slot.

An elongated aperture for the first fastener extends through the mounting bracket. The elongated aperture is alignable with the second aperture of the bottom portion of the support bracket and the first aperture of the base plate such that the mounting bracket is securable to the support bracket bottom portion and the base plate by the first fastener.

The clamp has a bottom flange, a body portion, an insert portion, and an upper flange. The bottom flange is configured to engage a door jamb of the vehicle.

The upper flange is connected to the insert portion by a first bend. The insert portion is connected to the body portion by a second bend. The body portion is connected to the bottom flange by a third bend.

The upper flange is configured to be inserted into the cutout in the bottom portion of the support bracket and through the slot of the mounting bracket. A second fastener can be extended through the fourth aperture of the bracket wall to engage the upper flange.

In one embodiment, the mounting system further comprises a cover plate. The cover plate includes a top section with an aperture to receive a fastener extendable through a fifth aperture of the bracket wall to interconnect the cover plate to the support bracket. In one embodiment, the fifth aperture of the bracket wall is positioned between the first lateral edge of the bracket wall and the fourth aperture.

The cover plate also includes a bottom section separated from the top section by a bend. The bottom section is configured such that it contacts and applies a force to the body portion of the clamp when the cover plate is interconnected to the bracket wall.

In one embodiment the clamp is formed of a single piece of material.

Optionally, the upper flange of the clamp is oriented at a first angle to the insert portion. The insert portion may be oriented at a second angle to the body portion. Additionally, or alternatively, the body portion is oriented at a third angle to the bottom flange. In one embodiment, the first, second, and third angles are different.

In one embodiment, the support bracket further comprises a support brace extending between the bottom portion and the top portion. The support brace may have a first width and the mounting bracket may have a notch with a second width that is greater than the first width.

Optionally, the projection of the mounting bracket extends into the cutout. The projection may contact the clamp when the second fastener engages the upper flange.

In one embodiment, the first aperture is threaded to engage a threaded portion of the first fastener.

Another aspect of the present disclosure is a system for attaching a roof rack to a roof of a vehicle. The system generally includes: (1) a base plate; (2) a support bracket having a bottom portion with a cutout, a top portion, and a bracket wall extending between the bottom portion and the top portion, the bracket wall having a bracket slot connected to the cutout, and the top portion including a top aperture for a fastener to engage the roof rack; (3) a mounting bracket having a slot; and (4) a clamp having a first flange and a second flange, the second flange configured to engage a door-jamb of the vehicle and, when the base plate, the support bracket, and the mounting bracket are interconnected by a fastener: (a) the bottom portion of the support bracket is positioned between the base plate and the mounting bracket; (b) the slot of the mounting bracket is aligned with the cutout of the support bracket; and (c) the clamp is selectively securable to the support bracket such that the first flange extends from the slot of the mounting bracket and the second flange extends out of the bracket slot of the bracket wall.

In one embodiment, the system further comprises a support brace extending from the bottom portion to the top portion of the support bracket.

The bracket wall may optionally include an aperture for a fastener to engage the first flange of the clamp. In one embodiment, the aperture in bracket wall is threaded to engage a threaded portion of the fastener to engage the first flange of the clamp.

Optionally, the fastener interconnecting the base plate, the support bracket, and the mounting bracket is threaded.

Still another aspect of the disclosure is a method of interconnecting a roof rack to a roof of a vehicle, comprising: (1) positioning a base plate of a rack mounting system within a recess of the roof of the vehicle; (2) positioning a bottom portion of a support bracket of the rack mounting system on the base plate; (3) inserting a first flange of a clamp of the rack mounting system through a bracket slot of the support bracket; (4) positioning a second flange of the clamp underneath a door jamb of the vehicle; (5) placing a mounting bracket of the rack mounting system over the support bracket bottom portion such that apertures in the base plate, the support bracket, and the mounting bracket are aligned and the first flange of the clamp extends through a slot of the mounting bracket; (6) securing the mounting bracket and the support bracket to the base plate; and (7) connecting the roof rack to a top portion of the support bracket.

The method may further include attaching a cover plate of the rack mounting system to a bracket wall of the support bracket such that the cover plate extends over a portion of the clamp.

In another embodiment the method includes inserting a fastener through an aperture in a bracket wall of the support bracket such that the fastener contacts a portion of the first flange of the clamp.

An additional aspect of the present disclosure is to provide an apparatus for securing a roof rack to a vehicle, comprising: (1) a support bracket having a cutout portion and having a bottom portion joined to a bracket wall, wherein the bottom portion has a first aperture, and the support bracket is configured to engage the roof rack; (2) a clamp having a bottom flange joined to a body portion and having the body portion joined to an insert portion, wherein the bottom flange and the body portion form an acute angle on an inner surface of the clamp such that the bottom flange is configured to be secured to a vehicle, wherein the body portion and the insert portion form an obtuse angle on the inner surface of the clamp such that the insert portion selectively extends through the cutout portion of the support bracket; and (3) a mounting bracket selectively positioned on top of an upper surface of the bottom portion of the support bracket and on top of the insert portion of the clamp, the mounting bracket having a second aperture that is configured to receive a first fastener that selectively extends into the first and second apertures to secure the mounting bracket to the support bracket and to secure the clamp to the support bracket.

In some embodiments, the apparatus further comprises an upper flange joined to the insert portion of the clamp, wherein the upper flange and the insert portion form an acute angle on an outer surface of the clamp; and a slot extending through the mounting bracket, wherein a width of the slot is larger than a width of the upper flange of the clamp such that the upper flange may extend through the slot when the mounting bracket is secured to the support bracket.

Optionally, the apparatus of the additional aspect may comprise a third aperture in the bracket wall of the support bracket, wherein the third aperture is configured to receive a second fastener that selectively contacts the upper flange of the clamp to put the upper flange in tension with the insert portion of the clamp.

The apparatus of the additional aspect may include one or more of the previous embodiments and may further comprise a projection extending from a bottom surface of the mounting bracket, wherein the projection selectively contacts the insert portion of the clamp as the mounting bracket is secured to the support bracket to secure the clamp to the support bracket.

In some embodiments, the apparatus further comprises a fourth aperture extending through the bracket wall of the support bracket; and a cover having a fifth aperture that is configured to selectively receive a third fastener that extends through the fourth and fifth apertures to secure the cover to the support bracket such that a lower end of the cover contacts the body portion of the clamp.

Optionally, the apparatus of the additional aspect may have the second aperture of the mounting bracket that is elongated such that a position of the mounting bracket can be adjusted relative to the bracket wall of the support bracket.

The apparatus of the additional aspect may include one or more of the previous embodiments and may further comprise a base plate selectively positioned against a lower surface of the bottom portion of the support bracket and configured to receive the first fastener to secure the support bracket to the base plate.

A further aspect of the present disclosure is to provide a method of constructing an apparatus for securing a roof rack to a vehicle, comprising (1) bending a support bracket to form an acute angle between a bottom portion and a bracket wall on an inner surface of the support bracket, wherein the bottom portion has a first aperture; (2) forming a cutout portion extending through the support bracket; (3) bending a clamp to form an acute angle between a bottom flange and a body portion on an inner surface of the clamp such that the bottom flange is configured to be secured to a vehicle; (4) bending the clamp to form an obtuse angle between the body portion and an insert portion on the inner surface of the clamp such that the insert portion is configured to be extended through the cutout portion of the support bracket; and (5) forming a second aperture in a mounting bracket such that the mounting bracket is configured to be positioned on top of an upper surface of the bottom portion of the support bracket and on top of the insert portion of the clamp and is configured to be secured by a fastener that selectively extends through the first and second apertures to secure the mounting bracket to the support bracket and to secure the clamp to the mounting bracket.

In some embodiments, the method of the further aspect comprises bending the clamp to form an acute angle between the insert portion and an upper flange on an outer surface of the support bracket; and forming a slot in the mounting bracket that is wider than the upper flange such that the upper flange is configured to extend through the slot as the mounting bracket is secured to the support bracket.

The method of the further aspect may include one or more of the previous embodiments and inserting part of the clamp through the cutout portion at a first angle; and rotating the clamp to a second angle that is distinct from the first angle to position the bottom flange of the clamp against a door jamb of the vehicle.

Optionally, the method of the further aspect may include (a) forming the second aperture in the mounting bracket with an elongated configuration; (b) extending the fastener through the first and second apertures as the clamp is positioned through the cutout portion of the support bracket; and (c) moving the mounting bracket inwardly and further extending the fastener fastener through the first and second apertures to secure the mounting bracket to the support bracket and to secure the clamp to the mounting bracket.

The method of the further aspect may include one or more of the previous embodiments and bending the support bracket to form an obtuse angle between the bracket wall and a top portion on the inner surface of the support bracket; and securing the roof rack to the top portion of the support bracket.

Another aspect of the present disclosure is to provide a system for securing a roof rack to a vehicle, comprising: (a) a support bracket configured to engage the roof rack, comprising: (i) a bracket wall; (ii) a bottom portion joined to the bracket wall; (iii) a cutout portion extending through the bracket wall and extending upwardly from a bottom edge of the bracket wall by a first distance; (b) a clamp, comprising: (i) a body portion; (ii) an insert portion joined to the body portion, wherein the body portion and the insert portion form an obtuse angle on an inner surface of the clamp; (iii) an upper flange joined to the insert portion, wherein the insert portion and the upper flange form an acute angle on an outer surface of the clamp, wherein the upper flange extends upwardly from the insert portion by a second distance that is larger than the first distance, and wherein the upper flange and the insert portion are insertable through the cutout portion of the support bracket; and (c) a mounting bracket having a slot that is wider than the upper flange of the clamp, wherein the upper flange at least partially extends into the slot as the mounting bracket is positioned over the clamp and secured to the bottom portion of the support bracket to limit movement of the clamp relative to the support bracket.

Optionally, the system of this aspect may comprise a base plate positionable on a roof of the vehicle, wherein a fastener secures the mounting bracket to the support bracket and secures the support bracket to the base plate such that a portion of a vehicle is secured between the base plate and a lower end of the clamp.

In some embodiments, the system of this aspect may comprise a top portion joined to the bracket wall of the support bracket. Optionally, the top portion is approximately parallel to the bottom portion of the support bracket. In some embodiments, the top portion is oriented at an angle of less than approximately 10° relative to the bottom portion. The top portion is configured to engage the roof rack.

In some embodiments, a support brace extends from the top portion to the bottom portion of the support bracket.

The system of this aspect may include one or more of the previous embodiments and a notch extending into an outer edge of the mounting bracket, wherein the support brace at least partially extends into the notch when the mounting bracket is secured to the bottom portion of the support brace.

In some embodiments, the system of this aspect may comprise a fastener selectively extendable through an aperture in the bracket wall of the support bracket to contact the upper flange of the clamp to place the upper flange in tension with the insert portion of the clamp.

Optionally, the system of this aspect may comprise a cover selectively connected to the bracket wall of the support bracket, wherein the cover comprises a top section joined to a bottom section, and the top and bottom sections form an obtuse angle on an inner surface of the cover, wherein a lower end portion of the bottom section contacts the outer surface of the clamp to secure the clamp to the support bracket.

In some embodiments, the system of this aspect may comprise a bottom flange joined to the body portion of the clamp and forming an acute angle with the body portion on the inner surface of the clamp, wherein the bottom flange is configured to engage a portion of the vehicle.

The system of this aspect may include one or more of the previous embodiments and wherein an outer width of the mounting bracket is larger than a width of the cutout portion of the support bracket such that the mounting bracket is positionable over the cutout portion as the mounting bracket is secured to the support bracket.

The Summary is neither intended nor should it be construed as being representative of the full extent and scope of the present disclosure. The present disclosure is set forth in various levels of detail in the Summary as well as in the attached drawings and the Detailed Description and no limitation as to the scope of the present disclosure is intended by either the inclusion or non-inclusion of elements, components, etc. in this Summary. Additional aspects of the present disclosure will become more clear from the Detailed Description, particularly when taken together with the drawings.

The phrases "at least one," "one or more," and "and/or," as used herein, are open-ended expressions that are both conjunctive and disjunctive in operation. For example, each of the expressions "at least one of A, B and C," "at least one of A, B, or C," "one or more of A, B, and C," "one or more of A, B, or C," and "A, B, and/or C" means A alone, B alone, C alone, A and B together, A and C together, B and C together, or A, B and C together.

The term "a" or "an" entity, as used herein, refers to one or more of that entity. As such, the terms "a" (or "an"), "one or more" and "at least one" can be used interchangeably herein.

Unless otherwise indicated, all numbers expressing quantities, dimensions, conditions, ratios, ranges, and so forth used in the specification and claims are to be understood as being modified in all instances by the term "about" or "approximately". Accordingly, unless otherwise indicated, all numbers expressing quantities, dimensions, conditions, ratios, ranges, and so forth used in the specification and claims may be increased or decreased by approximately 5% to achieve satisfactory results. Additionally, where the meaning of the terms "about" or "approximately" as used herein would not otherwise be apparent to one of ordinary skill in the art, the terms "about" and "approximately" should be interpreted as meaning within plus or minus 5% of the stated value.

All ranges described herein may be reduced to any sub-range or portion of the range, or to any value within the range without deviating from the invention. For example, the range "5 to 55" includes, but is not limited to, the sub-ranges "5 to 20" as well as "17 to 54."

The use of "including," "comprising," or "having" and variations thereof herein is meant to encompass the items listed thereafter and equivalents thereof as well as additional items. Accordingly, the terms "including," "comprising," or "having" and variations thereof can be used interchangeably herein.

It shall be understood that the term "means" as used herein shall be given its broadest possible interpretation in accordance with 35 U.S.C., Section 112(f). Accordingly, a claim incorporating the term "means" shall cover all structures, materials, or acts set forth herein, and all of the equivalents thereof. Further, the structures, materials, or acts and the equivalents thereof shall include all those described in the Summary, Brief Description of the Drawings, Detailed Description, Abstract, and Claims themselves.

BRIEF DESCRIPTION OF THE DRAWINGS

The accompanying drawings, which are incorporated in and constitute a part of the specification, illustrate embodiments of the disclosed system and together with the general description of the disclosure given above and the detailed description of the drawings given below, serve to explain the principles of the disclosed system(s) and device(s).

FIG. 4A is a left side elevation view of a clamp according to one embodiment of the present disclosure.

FIG. 4C is a rear elevation view of the clamp of FIG. 4A.

Figure 1A:
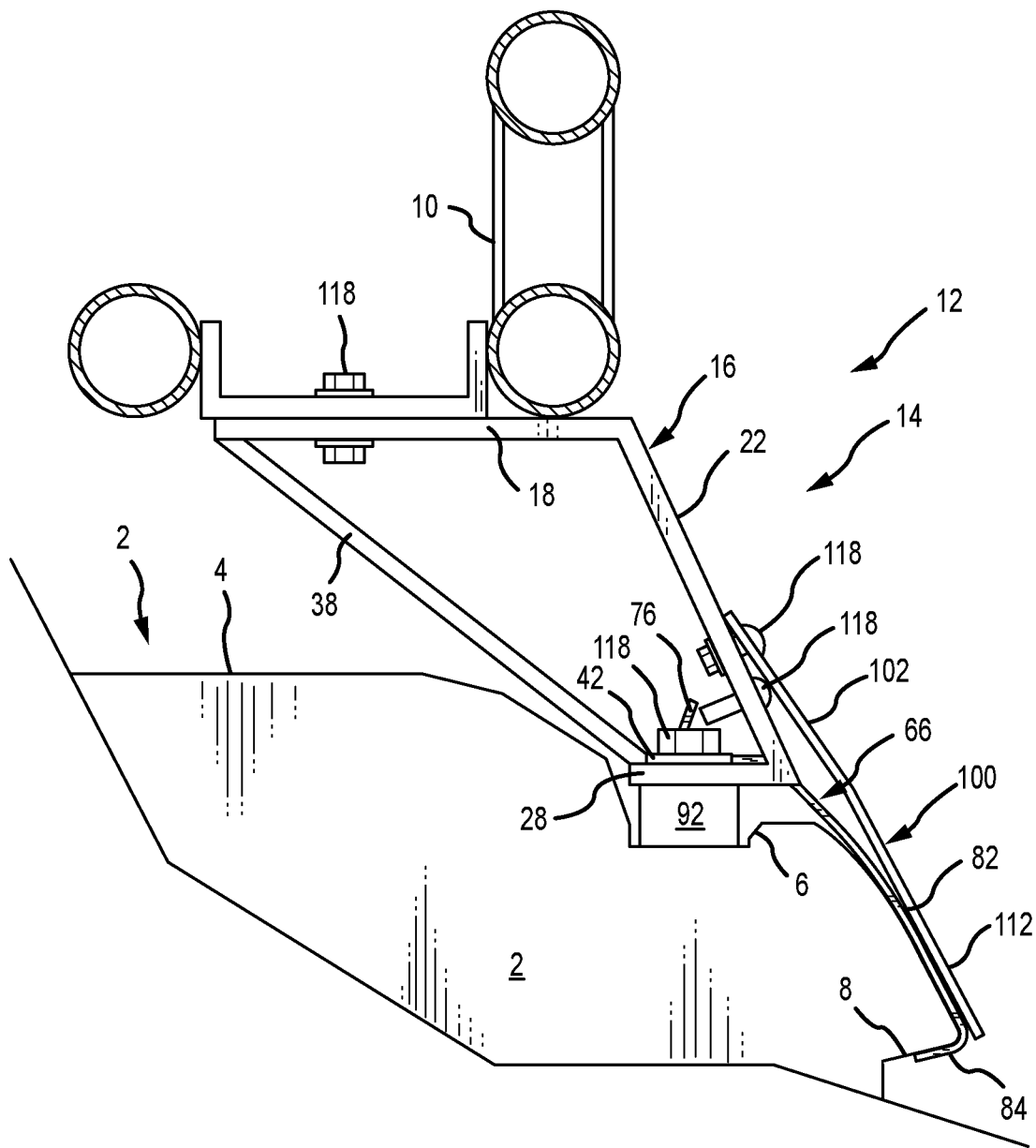
FIG. 1A is a partial schematic side elevation view of one embodiment of a mount of a mounting system interconnected to a vehicle and showing a cross-section of a portion of a rack interconnected to the mount.

The drawings are not necessarily (but may be) to scale. In certain instances, details that are not necessary for an understanding of the disclosure or that render other details difficult to perceive may have been omitted. It should be understood, of course, that the disclosure is not necessarily limited to the embodiments illustrated herein. As will be appreciated, other embodiments are possible using, alone or in combination, one or more of the features set forth above or described below. For example, it is contemplated that various features and devices shown and/or described with respect to one embodiment may be combined with or substituted for features or devices of other embodiments regardless of whether or not such a combination or substitution is specifically shown or described herein.

The following is a listing of components according to various embodiments of the present disclosure, and as shown in the drawings:

Number Component
2 Vehicle
4 Vehicle roof
6 Depression (or channel) of roof

8 Projection (or door-jamb) of vehicle
10 Roof rack
12 Mounting system
14 Mount
16 Support bracket
17 Inner surface
18 Top portion
19 Free end of top portion
20 Top aperture
22 Bracket wall
23A, 23B Sides of support bracket
24A, 24B, 24C Front apertures
26 Bracket slot
28 Bottom portion
29 Free end of bottom portion
30 Cutout
32 Cutout width
34 Bottom aperture
36A, 36B Folds
38 Support brace
40 Width of support brace
42 Mounting bracket
44 First side
46 Second side
48 Top surface
50 Bottom surface
52 Notch
54 Notch width
56 Slot
58 Slot width
60 Bolt hole or slot
62 Projection extending from bottom surface
64 Width of projection
66 Clamp
68A, 68B Sides of clamp
70 First (or exterior) surface of clamp
72 Second (or inner) surface of clamp
74 Width of body portion
76 First flange
77 Width of first flange
78 Free end of first flange
79 Aperture of first flange
80 Insert portion
81 Width of insert portion
82 Body portion
84 Second flange or hook
86 Free end of second flange
88A, 88B, 88C Bends
90A, 90B, 90C Angles
92 Base plate
94 Upper surface
96 Hole
98 Lower surface
100 Cover plate
102 Top section
104 Cutout
106 Aperture
108 First width of top section
110 Cover plate bend
112 Bottom section
114 Free end of bottom section
116 Second width of bottom section
118 Fastener (bolt or screw)

DETAILED DESCRIPTION

Referring now to FIGS. 1A-6B, a mount 14 of a mounting system 12 for a roof rack 10 according to one embodiment of the present disclosure is generally illustrated. The mounting system 12 is configured to interconnect the roof rack 10 to the roof 4 of a vehicle 2 without drilling holes in the vehicle.

The mounting system 12 includes a support bracket 16, a mounting bracket 42, a clamp 66, and a base plate 92. Optionally, a cover plate 100 is interconnected to the mount 14 when assembled.

Referring now to FIGS. 2A-2E, one embodiment of the support bracket 16 is generally illustrated. The support bracket 16 has a top portion 18, a bottom portion 28, and a bracket wall 22. The support bracket has a first side 23A and a second side 23B opposite to the first side. In some embodiments, the first and second sides 23A, 23B are approximately parallel. Alternatively, the first and second sides 23A, 23B are oriented at an oblique angle.

The top portion 18 is connected to the bracket wall 22 by a bend or a fold 36A. A free end 19 of the top portion 18 is positioned opposite to the fold 36A.

In one embodiment, the top portion is generally rectangular. Optionally, the top portion is approximately planar. The top portion 18 may be oriented approximately parallel to the bottom portion 28. Alternatively, in other embodiments, the top portion and the bottom portion are oriented at an oblique angle to each other. In some embodiments, the top portion is oriented at an angle of less than approximately 10° relative to the bottom portion.

The top portion 18 has a top aperture 20 for a fastener. In one embodiment, the top aperture 20 is elongated to form a slot for the fastener. Thus, once fasteners partially join the roof rack to multiple mounts, the positions of the mounts relative to the roof rack can be adjusted prior to final tightening of the fasteners. The top portion 18 optionally has two top apertures 20. However, the top portion may have any number of top apertures 20 to engage a roof rack 10.

The bottom portion 28 is connected to the bracket wall 22 by a bend or a fold 36B. A free end 29 of the bottom portion 28 is positioned opposite to the fold 3BA.

The bottom portion 28 is optionally generally rectangular and approximately planar. In one embodiment, a width of the bottom portion 28 is approximately equal to a width of the top portion 18.

A cutout 30 is formed through the bottom portion 28. The cutout 30 may have any desired configuration and size. The cutout has a predetermined width 32. In one embodiment, the cutout is generally rectangular.

The bottom portion 28 has a bottom aperture 34 for a fastener, such as a screw or a bolt. Optionally, the bottom portion includes two bottom apertures 34. The cutout 30 may be substantially centered between the two bottom apertures 34.

Figure 2A:
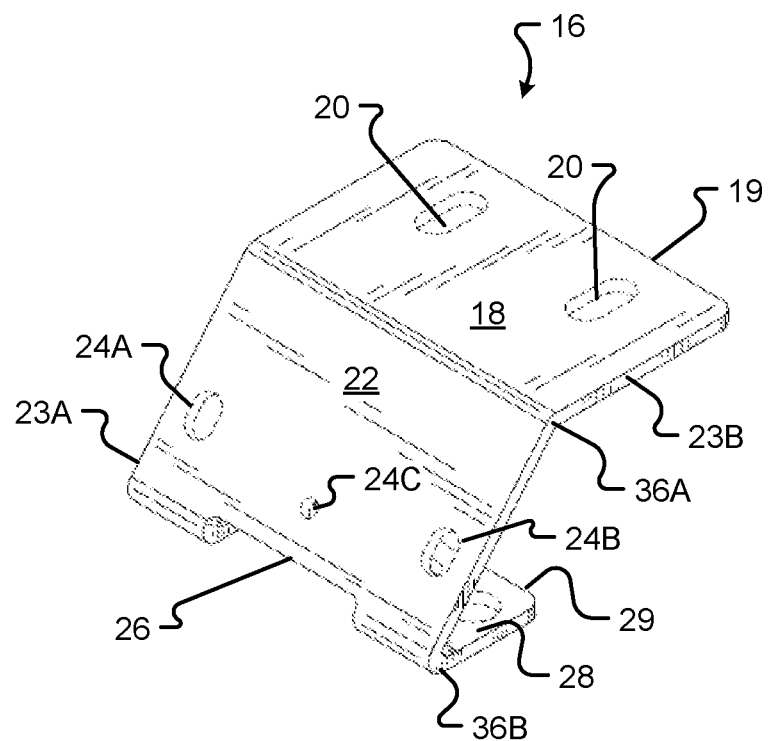
FIG. 2A is a perspective view of a support bracket according to one embodiment of the present disclosure.
Figure 2B:
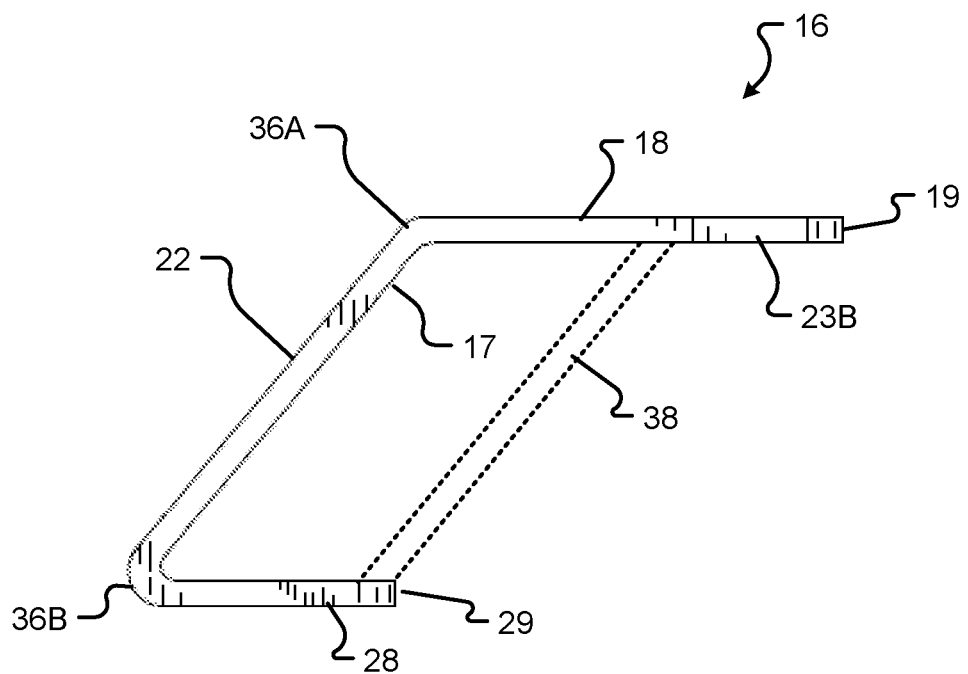
FIG. 2B is a side elevation view of the support bracket of FIG. 2A with an optional support brace.
Figure 2C:
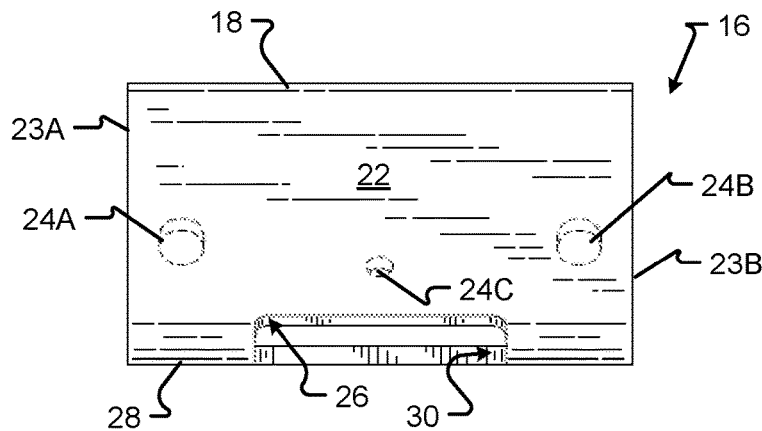
FIG. 2C is a front elevation view of the support bracket of FIG. 2A.
Figure 2D:
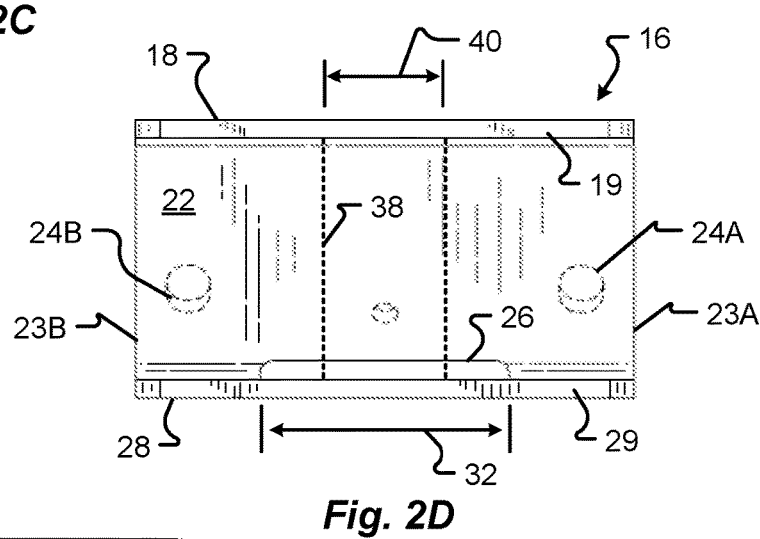
FIG. 2D is a rear elevation view of the support bracket of FIG. 2A with the optional support brace.
Figure 2E:
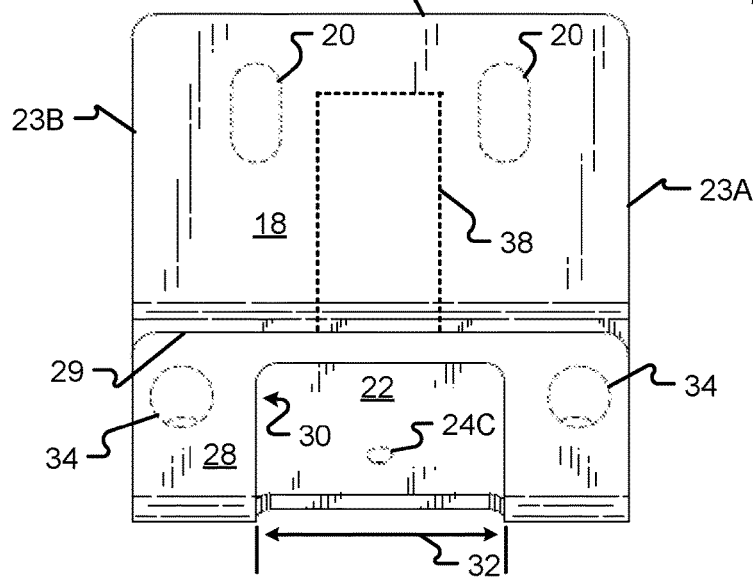
FIG. 2E is a bottom plan view of the support bracket of FIG. 2A illustrating a cutout formed through the bottom portion.

The bracket wall 22 extends between the top portion 18 and the bottom portion 28 of the support bracket 16. The cutout 30 formed through the bottom portion 28 may optionally extend through the bracket wall 22 to define a bracket slot 26 as generally illustrated in FIG. 2C. The bracket slot 26 is contiguous with the other portions of the cutout 30, and therefore, the bracket slot 26 and the other portions of the cutout 30 can be collectively described as a cutout or cutout portion in some embodiments. The bracket slot 26 extends upwardly from a bottom edge of the bracket wall towards the top portion by a distance to receive a portion of a clamp, as described herein.

Optionally, the bracket wall is approximately rectangular. In one embodiment, the bracket wall is approximately planar. The bracket wall 22 intersects the bottom portion 28 at an acute angle and intersects the top portion 18 at an obtuse angle. In one embodiment, an interior angle between the bracket wall and the bottom portion on the inner surface 17 of the support bracket is between about 30° and about 70°, or about 50°. Optionally, an interior angle between the bracket wall and the top portion on the inner surface 17 of the support bracket is between about 110° and about 150°, or about 130°.

The bracket wall 22 has a front aperture 24 for a fastener. In one embodiment, the bracket wall includes three front apertures 24A-C. The front apertures 24A-C may be arranged with two outer front apertures 24A, 24B proximate to respective sides 23A, 23B of the bracket wall and the third front aperture 24C approximately centered between the sides 23A, 23B of the bracket wall. In one embodiment, the two outer front apertures 24A, 24B are not threaded. Additionally, or alternatively, the third front aperture 24C is threaded in one embodiment. The front apertures 24A-C may all be of the same size. Alternatively, the outer front apertures 24A, 24B may be a first size and the third front aperture 24C may be a different second size.

The support bracket 16 may be formed from a single piece of material that has been constructed to form the top portion, the bracket wall, and the bottom portion. In one embodiment, the support bracket 16 is formed of a single piece of material with a first fold 36A between the top portion 18 and the bracket wall 22 and a second fold 36B between the bracket wall and the bottom portion 28. Alternatively, the top portion, bracket wall, and the bottom portion are formed of two or more separate pieces of material that are connected, for example, by welding or any other suitable means known to those of skill in the art. The support bracket 16 may be formed of one or more of a metal, a plastic, or other suitable material, such as carbon fiber.

In one embodiment, the support bracket 16 includes an optional support brace 38. The support brace 38 extends between the top portion 18 and the bottom portion 28. The support brace 38 is interconnected to the support bracket 16 in any suitable manner including welding. In one embodiment, the support brace 38 extends from an edge of the bottom portion 28 and intersects the top portion at a point that is spaced from edges of the top portion as generally illustrated in FIG. 2B. In another embodiment, the optional support brace 38 extends from a back edge of the bottom portion 28 and is interconnected to a back edge of the top portion 18 as generally shown in FIG. 1A.

The support brace 38 may be generally rectangular. In one embodiment, the support brace 38 has a width 40 that is less than widths of the top and bottom portions of the support bracket 16. Optionally, the width 40 of the support brace 38 is less than the width 32 of the cutout 30.

Figure 3A:
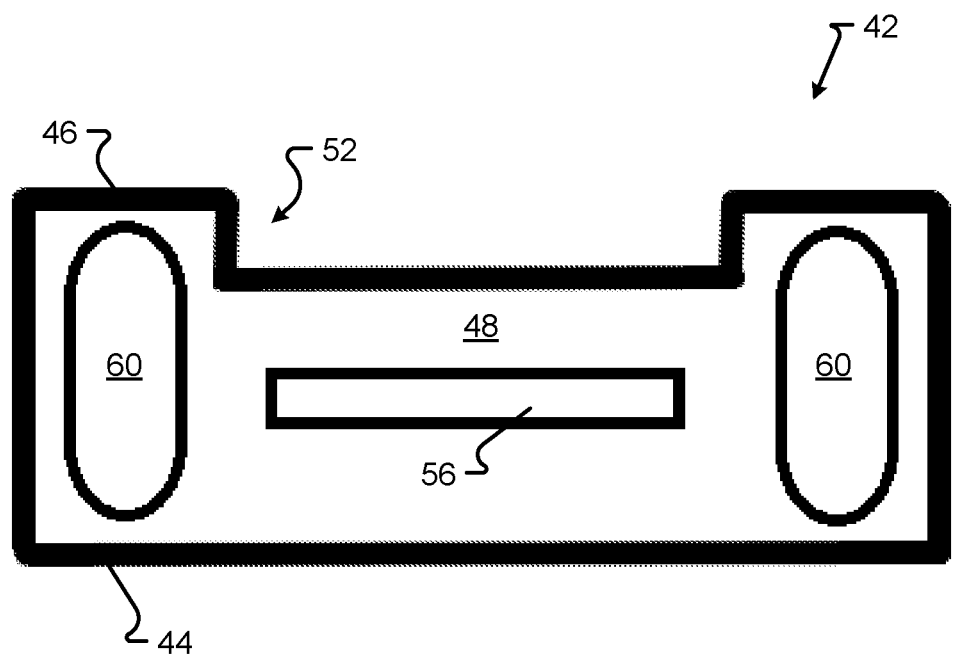
FIG. 3A is a top plan view of a mounting bracket according to one embodiment of the present disclosure.
Figure 3B:
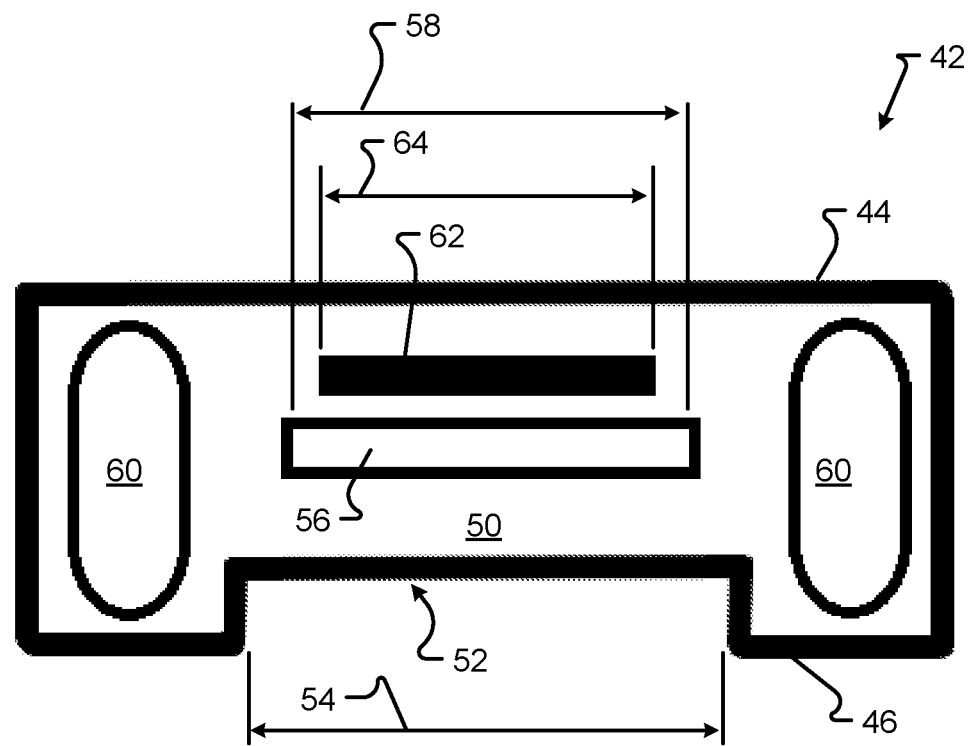
FIG. 3B is a bottom plan view of the mounting bracket of FIG. 3A.

FIGS. 3A-3B generally illustrate one embodiment of a mounting bracket 42 of the present disclosure. The mounting bracket may be formed of a single piece of material, preferably a metal. However, the mounting bracket can also be formed of other materials, such as a plastic. A top surface 48 of the mounting bracket 42 generally defines a plane. In one embodiment, the mounting bracket is approximately rectangular and includes a first side 44 and an opposite second side 46.

Optionally, a notch 52 is formed in the second side 46 of the mounting bracket 42. The notch 52 is configured to provide separation between the second side 46 of the mounting bracket 42 and the support brace 38 of the support bracket 16. More specifically, the notch 52 ensures the support brace 38 does not interfere with movement of the mounting bracket 42 as its position relative to the support bracket 16 is adjusted when connecting a roof rack to a vehicle. Accordingly, the notch 52 has a notch width 54 that is greater than the width 40 of the support brace 38.

A slot 56 is formed through the mounting bracket 42. In one embodiment, the slot extends approximately parallel to the first side 44. The slot width 58 may be approximately equal to the width 32 of the cutout 30 of the support bracket 16 or be a different width.

A bolt hole 60 extends through the mounting bracket 42. In one embodiment, the bolt hole 60 is oblong or elongated to facilitate adjustment of the mounting bracket 42 relative to the support bracket 16. The elongated bolt hole 60 has a long axis that is oriented approximately perpendicular to the first side. In one embodiment the mounting bracket 42 has two bolt holes 60. During installation and adjustment of the mounting system 12, the elongated bolt holes 60 allow the mounting bracket 42 to be pressed inwardly toward (or withdrawn outwardly from) the center of the vehicle. In this manner, the slot 56 of the mounting bracket 42 is pressed tightly against the clamp 66 as will be further described herein.

As generally illustrated in FIG. 3B, a projection 62 extends from a bottom surface 50 of the mounting bracket 42. The projection 62 is formed between the slot 56 and the first side 44. A width 64 of the projection 62 is oriented approximately parallel to the first side 44. The projection 62 is configured to extend into the cutout 30 formed in the bottom portion 28 of the support bracket 16. Accordingly, the width 64 of the projection 62 is less than the width 32 of the cutout 30. When the mounting system 12 is assembled, the projection 62 contacts and applies a force to the clamp 66.

Figure 4B:
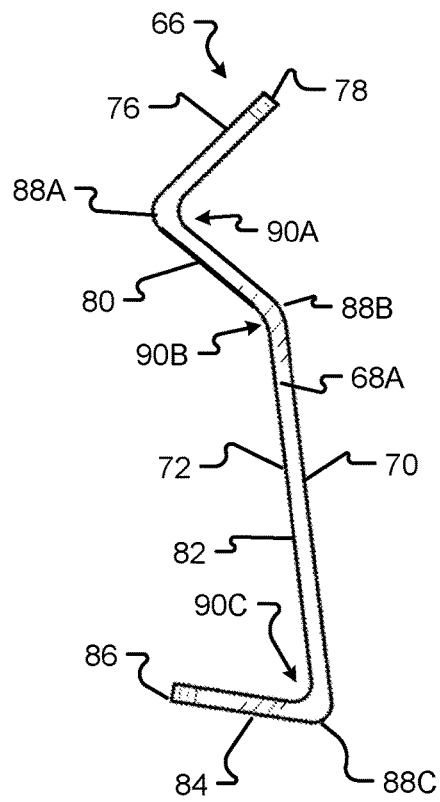
FIG. 4B is front perspective view of the clamp of FIG. 4A.
Figure 4B:
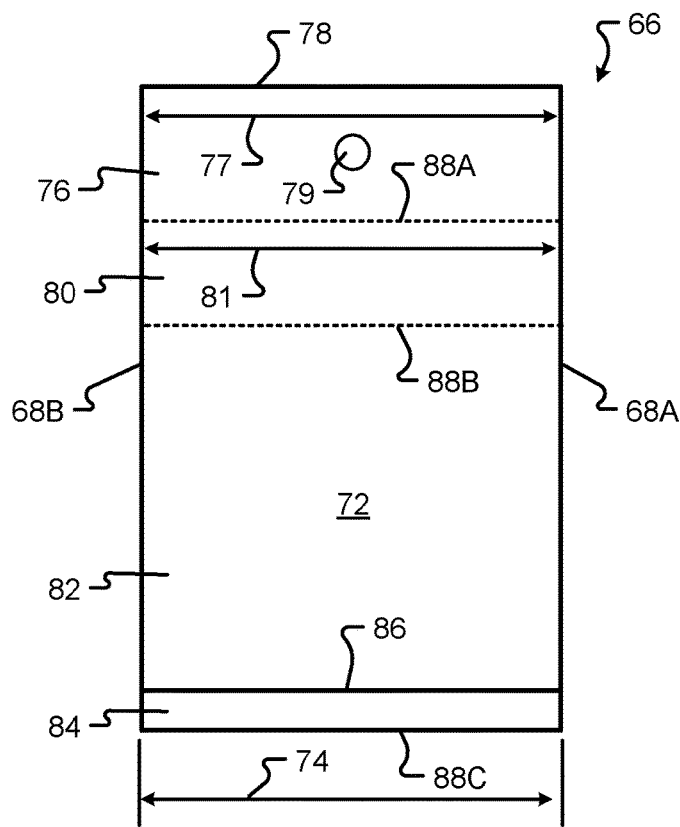
Figure 4B:
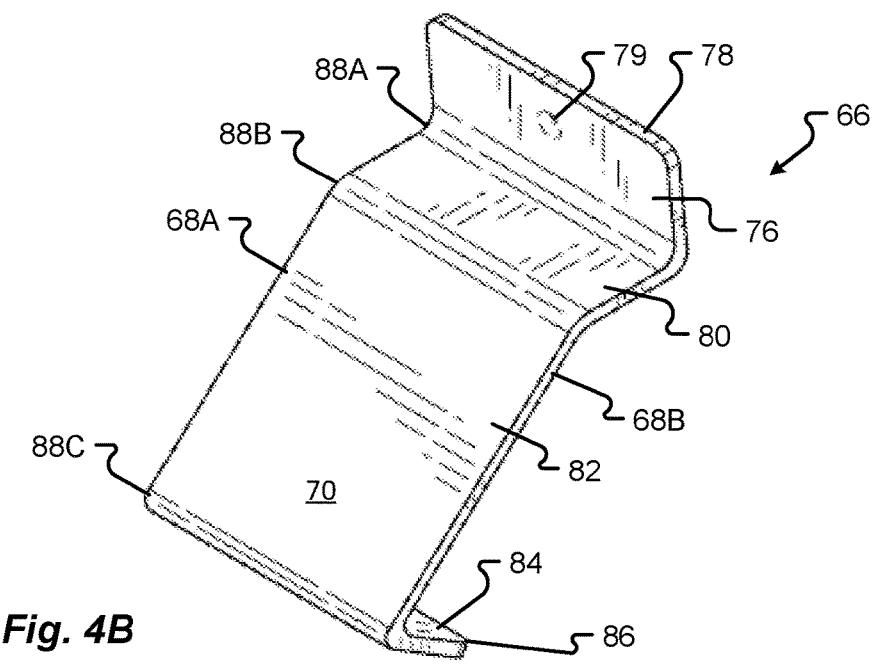

Referring now to FIGS. 4A-4C, one embodiment of a clamp 66 of the present disclosure is generally illustrated. The clamp 66 has a first side 68A, a second side 68B, a first or outer surface 70, and a second or inner surface 72. A width 74 of the body portion 82 of the clamp 66 is defined by the distance between the first and second sides 68A, 68B.

In some embodiments, the first side 68A is approximately parallel to the second side 68B. Alternatively, in other embodiments, the first and second sides 68A, 68B are oriented at an oblique angle to each other.

The clamp 66 includes a first flange 76, an insert portion 80, a body portion 82, and a second flange 84. In one embodiment the first and second flanges, the insert portion, and the body portion are each generally rectangular. One or more of the first and second flanges and the insert and body portions may be approximately planar.

The clamp 66 may be a single piece of material. In one embodiment, the clamp is extruded. Alternatively, the clamp 66 is bent into a desired configuration. In one embodiment, the clamp 66 includes three turns or bends 88. A first bend 88A separates the first flange 76 from the insert portion 80. A second bend 88B is formed between the insert portion 80 and the body portion 82. The second flange 84 is separated from the body portion 82 by a third bend 88C.

The clamp may be formed of a metal, a plastic, or other suitable material such as carbon fiber. The clamp 66 may alternatively be comprised of multiple pieces of material that are attached to form a single piece.

Figure 1B:
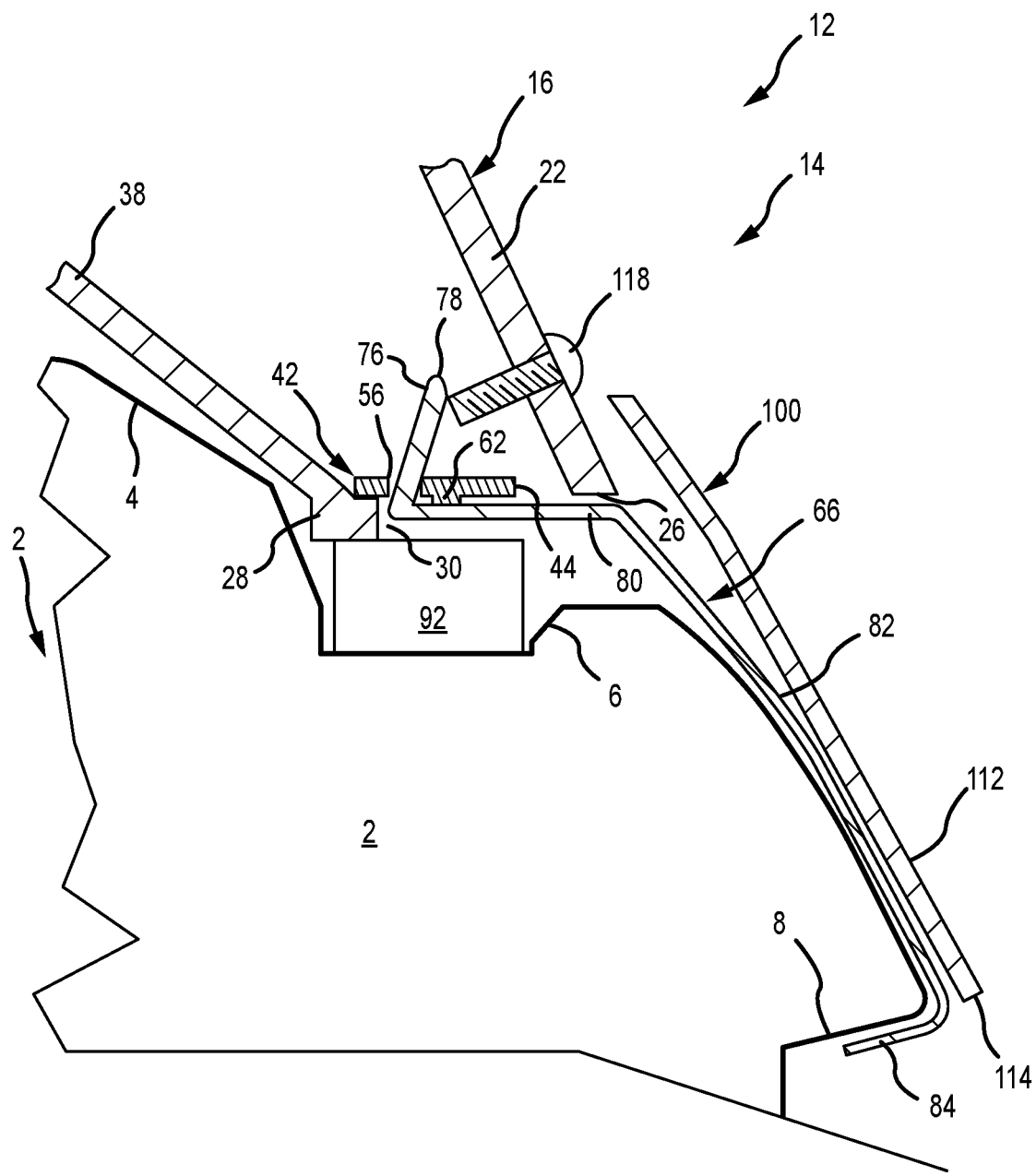
FIG. 1B is an expanded cross-sectional side elevation view showing portions of the mount of FIG. 1A interconnected to the vehicle.

The first flange 76 has a free end 78 opposite to the first bend 88A. Optionally, a depression or aperture 79 is formed in the second surface 72 of the first flange 76. The aperture 79 is positioned to receive an end of a bolt 118 extending through the bracket wall 22 of the support bracket 16 when the mount 14 is assembled. Moreover, when the mount 14 is assembled, the free end 78 of the first flange extends through the cutout 30 of the support bracket 16 as generally illustrated in FIG. 1B. Accordingly, the width 77 of the first flange 76 is less than or approximately equal to the width 32 of the cutout 30. The width 81 of the insert portion 80 is also less than or equal to the width 32 of the cutout 30. The width 74 of the body portion 82 and the second flange 84 may be the same or different than the width 81 of the insert portion 80 and the width 77 of the first flange 76. In some embodiments, the width 74 of the body portion 82 is greater than the width 81 of the insert portion. Optionally, the width 81 of the insert portion is greater than the width 77 of the first flange.

The second flange 84 extends from the second surface 72 of the body portion 82 at an acute angle 90C and ends at free end 86. In some embodiments, the angle 90C is between approximately 70° and approximately 90°.

The insert portion 80 also extends away from the second surface 72 of the body portion 82. The junction of the body portion 82 and the insert portion 80 forms an obtuse angle 90B.

The first flange 76 extends away from the first surface 70 of the insert portion 80 in the opposite direction of the second flange 84. The first flange 76 forms an angle 90A with the first surface 70 of the insert portion 80 that may be slightly acute, orthogonal, or slightly obtuse. In some embodiments, the angle 90A is from approximately 80° to approximately 100°.

In some embodiments, the second surface 72 of the clamp 66, or at least the second flange 84 and the body portion 82 may have a safety coating. This safety coating prevents the second flange 84 and body portion 82 from scratching or otherwise damaging surfaces of the vehicle 2. The safety coating may be comprised of a rubber, a plastic, a polymer (such as nylon) or another suitable material.

Figure 5A:
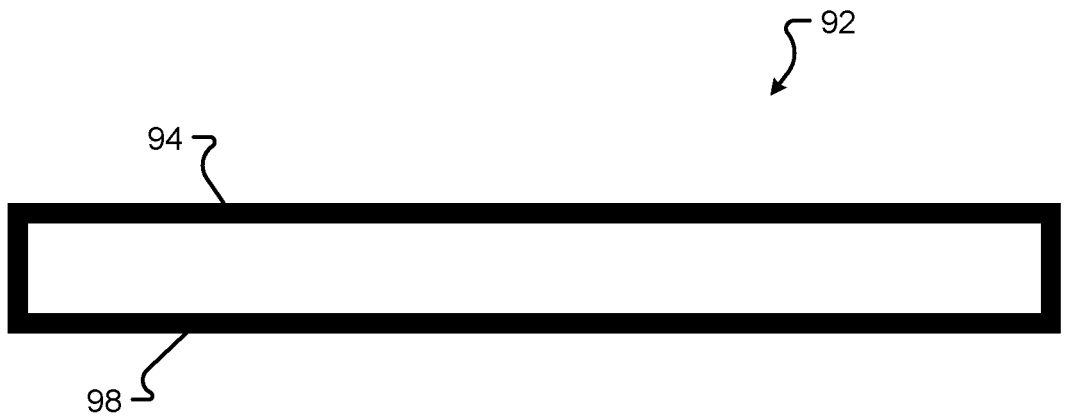
FIG. 5A is a front elevation view of a base plate of one embodiment of the present disclosure.
Figure 5B:
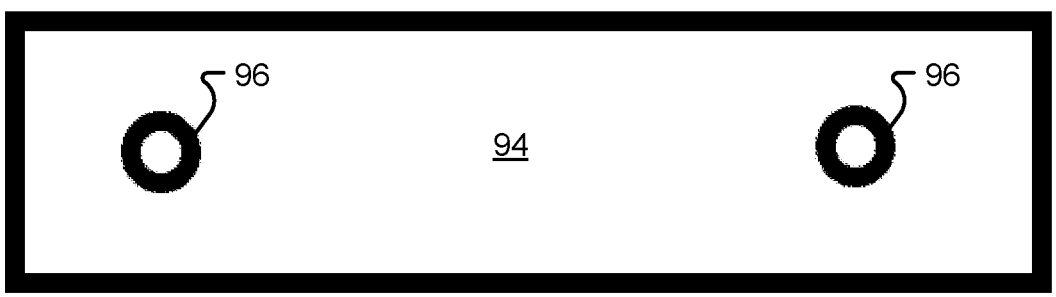
FIG. 5B is a top plan view of the base plate of FIG. 5A.
Figure 5C:
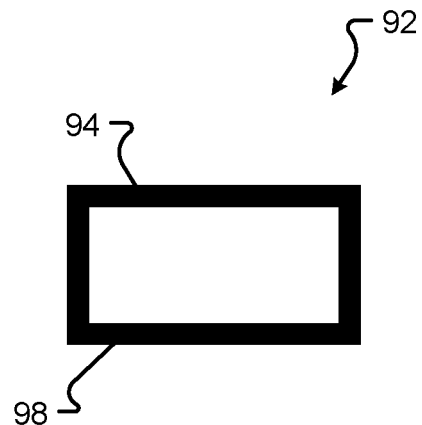
FIG. 5C is a side elevation view of the base plate of FIG. 5A.

Referring now to FIGS. 5A-5C, one embodiment of a base plate 92 of the present disclosure is generally illustrated. The base plate 92 is generally rectangular and may be formed of a single piece of material. Alternatively, the base plate may be layered or have an internal piece with a covering material. The base plate 92 may be formed of one or more of a metal, a plastic, or some other material such as carbon fiber or rubber. Optionally, the base plate is formed from aluminum.

The base plate may have a protective coating to prevent damage to the vehicle exterior. In one embodiment, the protective coating is at least one of a plastic, a rubber, or a nylon material. Optionally, at least a bottom surface 98 of the base plate 92 has a protective coating. In one embodiment, the protective coating is selected to increase the friction between the base plate 92 and the vehicle to prevent or reduce inadvertent or unintended movement of the base plate relative to the vehicle.

The base plate 92 has a hole 96 extending into an upper surface 94. Optionally, the hole extends through the base plate and through the lower surface 98. The hole 96 has internal threads to receive a threaded fastener, such as a screw or a bolt. In one embodiment, the base plate includes two holes 96. The holes 96 may be of the same diameter as the bottom aperture 34 of the support bracket 16, or of a different diameter. The holes 96 of the base plate are configured to align with the bolt holes 60 of the mounting bracket 42 and with the bottom apertures 34 of the support bracket 16.

It will be appreciated that some embodiments of the present disclosure do not include a separate base plate 92. Instead, in some embodiments, a lower surface of the bottom portion 28 of the support bracket 16 may contact the roof of a vehicle and, along with the clamp 66, provide a sufficient clamping force to secure a roof rack to a vehicle. In further embodiments, the support bracket 16 may include a projection that extends from a lower surface of the bottom portion 28 and into a gutter or other portion of a vehicle to serve the same function as the base plate 92.

Figures 6A, 6B:
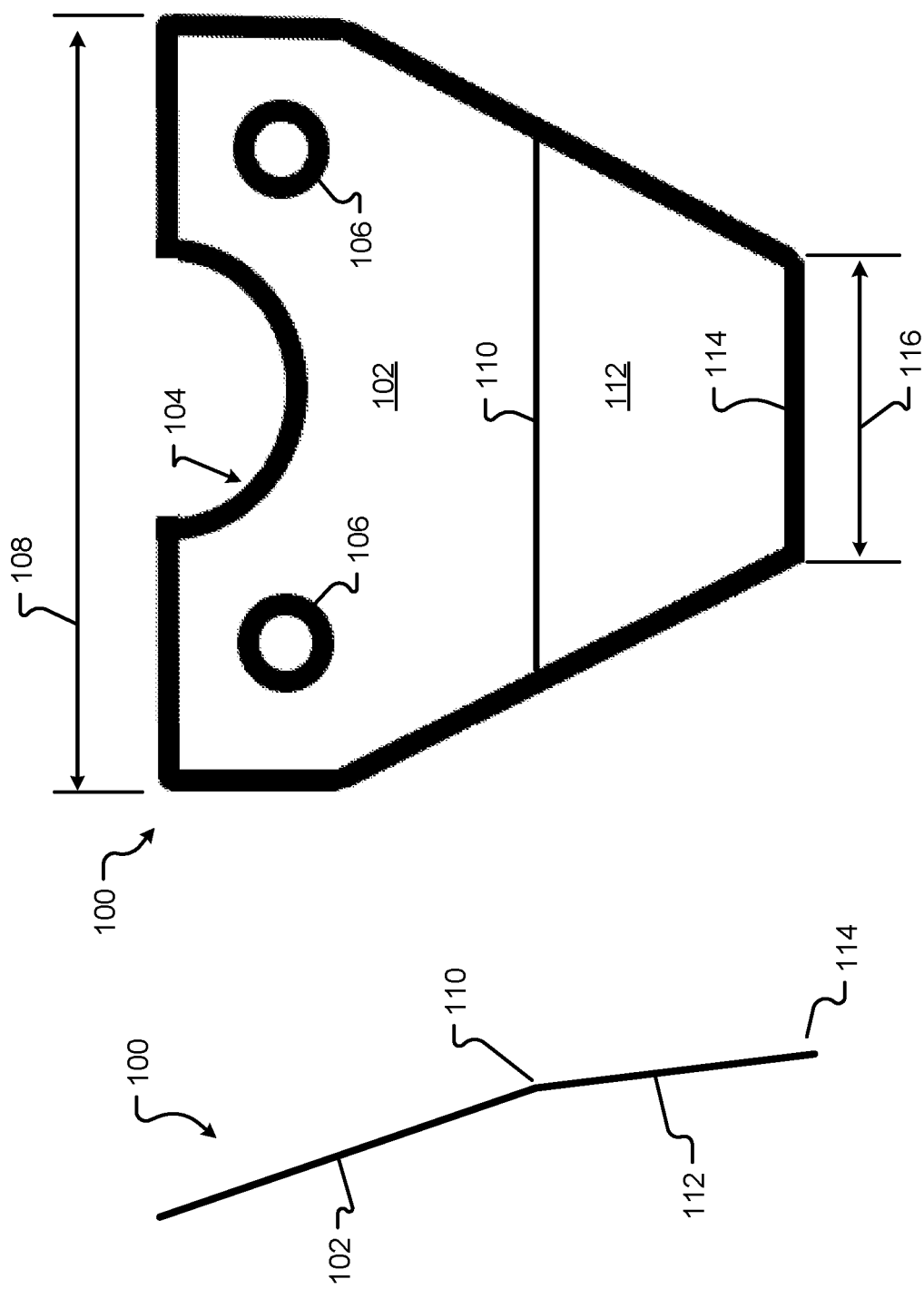
FIG. 6A is a side elevation view of a cover plate according to one embodiment of the present disclosure.
FIG. 6B is a front elevation view of the cover plate of FIG. 6A.

Referring now to FIGS. 6A, 6B, one embodiment of a cover plate 100 is generally illustrated. The cover plate 100 may optionally be interconnected to a mount 14 of the mounting system 12. The cover plate 100 may be made of a single piece of material with a cover plate bend 110 separating a top section 102 from a bottom section 112. Accordingly, the top section 102 is oriented at an angle with respect to the bottom section 112.

In one embodiment, the top section 102 has a cutout 104 where material has been removed. The cutout 104 may have a configuration defined by an arc. In one embodiment, the cutout is approximately semicircular. Other configurations of the cutout are contemplated.

Optionally, the top section 102 tapers as it transitions into the bottom section 112. Accordingly, in one embodiment, the top section 102 has a first width 108 that is greater than a second width 116 of the bottom section 112.

The cover plate 100 includes an aperture 106 through the top section 102 for a fastener to engage (or extend through) a front aperture 24A or 24B of the support bracket 16. In this manner, the cover plate 100 is selectively interconnected to the bracket wall 22 of the support bracket. In one embodiment, the top section 102 has at least two apertures 106. The apertures 106 may be situated symmetrically on opposite sides of the cutout 104.

In one embodiment, the bottom section 112 is a tapered quadrangle with a free end 114 being of smaller width than the bend 110. The bend 110 creates an angle between the top section 102 and the bottom section 112. The angle of the bend 110 is between approximately 2 degrees and approximately 15 degrees such that the top section 102 and bottom section 112 form an obtuse angle with each other.

The bottom section 112 is configured to contact and apply a force to the body portion 82 of the clamp 66 when the cover plate 100 is interconnected to the support bracket 16. More specifically, because of the cover plate bend 110, the bottom section 112 is oriented toward the body portion 82 of the clamp when the top section 102 of the cover plate is interconnected to the support bracket 16. In this manner, the bottom section 112 biases the body portion 82 of the clamp 66 toward the vehicle 2 when the mounting system is interconnected to the vehicle. The biasing force of the bottom section 112 presses the second flange 84 of the clamp 66 under the door jamb 8 of the vehicle 2 as generally illustrated in FIG. 1A. Accordingly, when present, the cover plate 100 helps to maintain the clamp 66 in a preferred orientation relative to the vehicle.

In one embodiment, the second width 116 of the bottom section 112 is not less than the width 74 of the clamp 66. Accordingly, when the mounting system 12 is positioned on a vehicle and the optional cover plate 100 is interconnected to the support bracket 16, the cover plate 100 and its bottom section 112 substantially cover the exterior or first surface 70 of the clamp 66. In this manner, the cover plate 100 protects the body portion 82 of the clamp from damage due to impact from objections such as tree limbs.

Referring again to FIGS. 1A and 1B, a partial schematic side elevation view and a cross-sectional side elevation view of one embodiment of a mount 14 of the mounting system 12 interconnected to a vehicle 2 are provided. The base plate 92 is positioned within a gutter or depression 6 in a roof 4 of the vehicle 2. The bottom portion 28 of the support bracket 16 is positioned on top of the base plate 92. The support bracket 16 is oriented with the bracket wall 22 facing away from the roof 4 and the optional support brace 38 extending towards the center of the roof 4.

The mounting bracket 42 is positioned over the bottom portion 28 of the support bracket 16 and the base plate 92. In this configuration, the bolt holes 60 of the mounting bracket 42 align with the bottom apertures 34 of the support bracket 16 and the holes 96 of the base plate 92. A threaded fastener, such as a bolt 118 extends through the aligned holes 34, 60, 96 such that the base plate 92, support bracket 16, and mounting bracket 42 are secured to one another.

A roof rack 10 is interconnected to the top portion 18 of the support bracket 16 by a fastener, such as a bolt 118, that extends through the top aperture 20. The top portion 18 of the support bracket 16 is oriented towards the center of the vehicle 2. In some embodiments, the support brace 38 is welded to inner surfaces of the top portion 18 and the bottom portion 28 of the support bracket 16 so as to support the top portion 18. Optionally, the support brace 38 is connected to the top portion 18 proximate to its free end 19. Additionally, or alternatively, the support brace 38 may be connected to the bottom portion 28 proximate to its free end 29. Although the bottom portion 28 is illustrated in FIG. 1A as being approximately parallel to the top portion 18, in other embodiments, the bottom portion 28 may not be parallel with the top portion 18. For example, in some embodiments the bottom portion 28 is oriented at an angle of less than approximately 10° relative to the top portion 18.

As shown in FIG. 1B, the clamp 66 is inserted through the cutout 30 of the support bracket 16 and through the slot 56 of the mounting bracket 42 such that the first flange 76 extends above the top surface 48 of the mounting bracket 42 within the support bracket 16. Optionally, the first or upper flange 76 may extend partially into the slot 56 of the mounting bracket 42. In one embodiment, at least a portion of the insert portion 80 of the clamp extends through the cutout 30 and into the slot 56 of the mounting bracket 42. The projection 62 of the mounting bracket 42 extends into the cutout 30 formed in the bottom portion of the support bracket. The projection 62 contacts and applies a force to the clamp 66. For example, the projection 62 may contact the exterior surface 70 of the insert portion 80 of the clamp.

Notably, the first side 44 of the mounting bracket 42 is positioned as far away from the bracket wall 22 of the support bracket as possible. In this manner, an edge of the slot 56 contacts and applies a force to the first flange 76. The contact and resulting force help prevent unintended or inadvertent movement of the first flange downwardly through the slot 56 of the mounting bracket 42.

The body portion 82 of the clamp and the second flange 84 are positioned outside the bracket cutout 30. The clamp body 82 extends down towards the door of the vehicle 2 and the second flange 84 is inserted under the door jamb or projection 8 of the vehicle.

A bolt 118 extends through the front aperture 24C of the bracket wall 22 and contacts the first flange 76 of the clamp 66. In this manner, the bolt 118 applies a force to the first flange 76, pushing the first flange inwardly away from the bracket wall 22 of the support bracket 16. The bolt 118 thus places the first flange 76 and the clamp insert 80 in tension. As a result, the support bracket 16 can transfer lateral and horizontal loads to the clamp 66 and vehicle as the roof rack experiences lateral and horizontal loads. When assembling a roof rack with multiple mounts, the bolt 118 through the front aperture 24C for each mount may be set to a common depth across all mounts to ensure an equal force is applied to each clamp 66.

Referring again to FIG. 1A, the cover plate 100 is optionally attached by a bolt 118 that extends through the aperture 106 of the cover plate and the outer aperture 24A, 24B of the bracket wall 22 of the support bracket 16. The bolt 118 contacting the first flange 76 is situated within the cover plate cutout 104. The bottom section 112 of the cover plate 100 presses against the clamp body portion 82. While the mounting system 12 is shown as being constructed using insertable screws and screw accommodating holes, any suitable method of attachment can be used to realize the invention. For example, the bracket wall 22 could have a projection to contact the first flange 76 rather than using a bolt 118.

Figure 7:
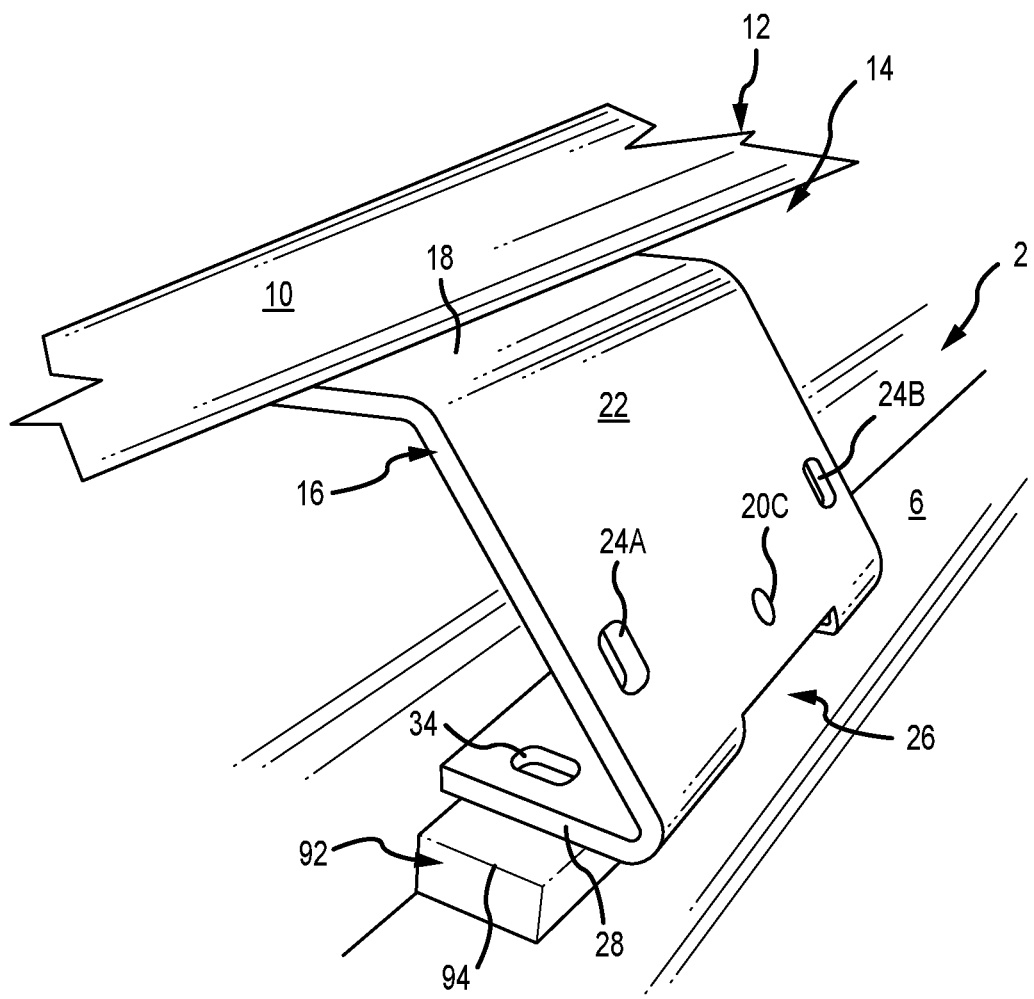
FIG. 7 is a perspective view of a mount of the mounting system at one phase of assembly.

FIG. 7 shows one embodiment of the mounting system 12 partially assembled. The support bracket 16 is on top of the base plate 92 with the support bracket bottom portion 28 resting on the upper surface 94 of the base plate 92. The bottom apertures 34 of the bottom portion 28 are aligned with the holes 96 of the base plate. The roof rack 10 is secured to the top portion 18 of the support bracket 16.

Figure 8:
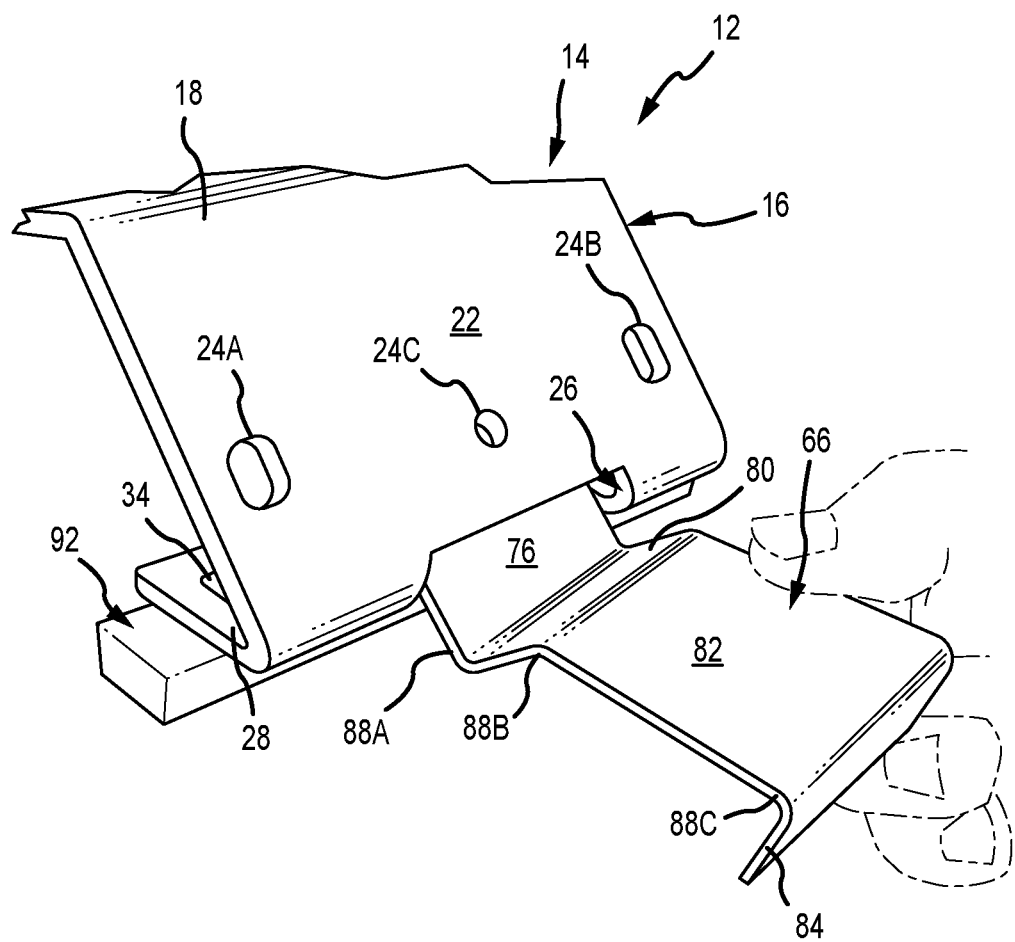
FIG. 8 is a perspective view of the mount at a later phase of assembly.
Figure 9:
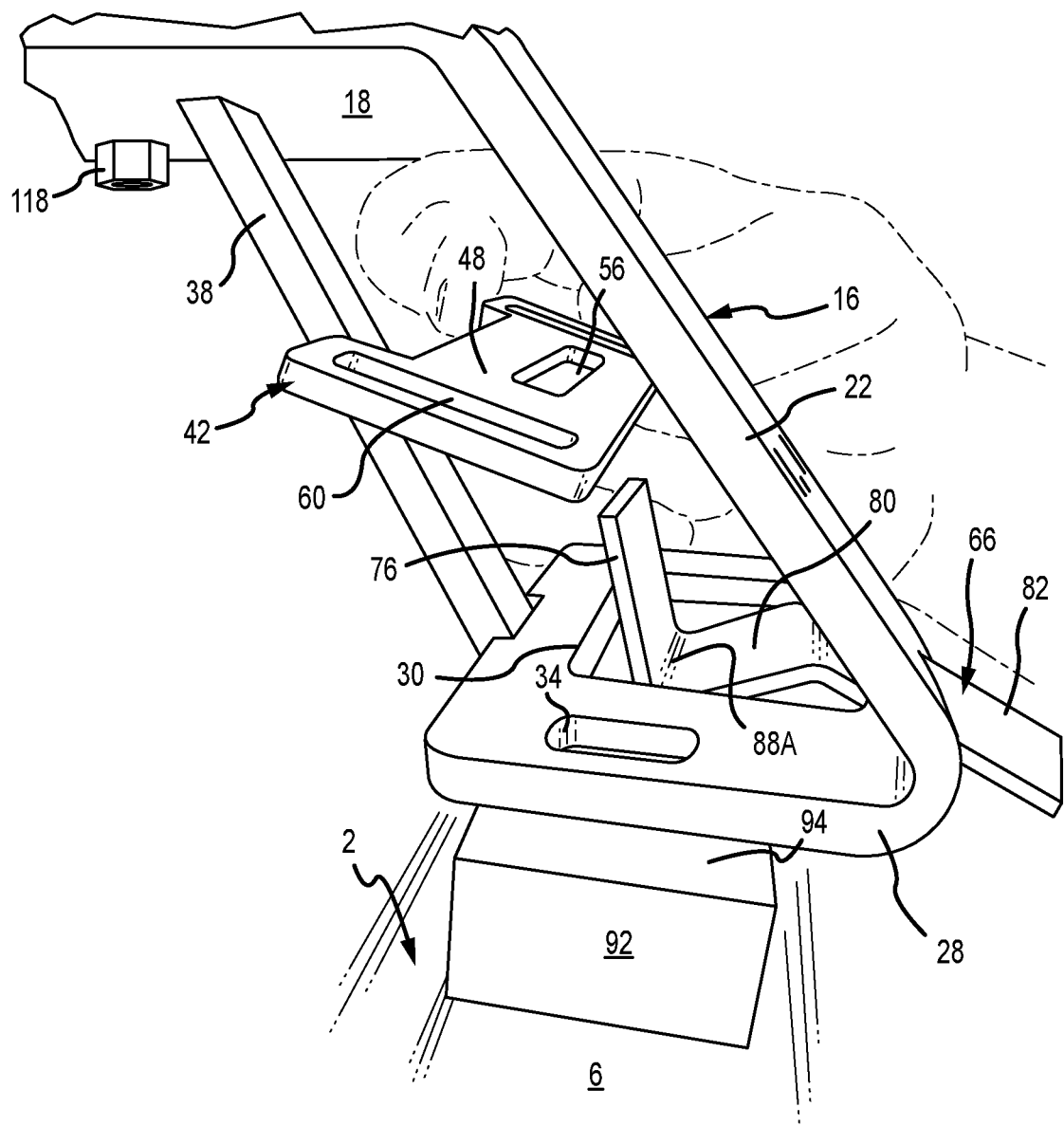
FIG. 9 is a perspective view of the mount at another phase of assembly.

Referring now to FIGS. 8 and 9, an embodiment of the mounting system 12 is illustrated with a mount 14 in a partially assembled state. Various methods of construction are contemplated, including methods of manufacturing the components of the mounting system 12 and/or methods of assembling the components of the mounting system 12. As described herein, material blanks can be bent and formed with portions removed to produce the components of the mounting system 12. Moreover, these components can be moved and oriented relative to each as well as fastened together to fully assemble the mounting system 12.

In FIG. 8, the support bracket 16 is positioned on top of the base plate 92 and the clamp 66 is being inserted through the bracket slot 26 into the cutout 30 of the support bracket 16 with the clamp 66 at a first angle or orientation relative to the support bracket 16. The first flange 76 is positioned to be inserted into the cutout 30 formed in the bottom portion 28 of the support bracket 16.

FIG. 9 shows the clamp 66 fully inserted into the support bracket 16. The first flange 76 and the clamp insert portion 80 are through the cutout 30 of the support bracket 16, and the clamp 66 has been rotated to a second angle or orientation relative to the support bracket 16. As a result, part of the clamp 66 is positioned in the cutout 30 of the support bracket 16, and a portion of the clamp 66 extends into an interior volume defined by the various portions of the support bracket 16. In this embodiment, the upper flange 76 extends upwardly from the cutout portion and above the bottom portion 28 of the support bracket 16. This upward disposition of the upper flange 76 allows for control of movement of the clamp 66 relative to the support bracket 16.

First, lateral movement of the clamp 66 is constrained by the dimensions of the width 77 of the upper or first flange 76 and the insert portion 80 of the clamp 66 relative to the width 32 of the cutout 30 of the support bracket 16. Specifically, the cutout width 30 is only slightly larger than the width 77 of the first flange 76 and the insert portion 80 to constrain or limit the lateral movement of the clamp 66 once the clamp 66 extends into the cutout portion of the support bracket 16.

Next, the inward and outward movement of the clamp 66 is limited in several ways. The upper flange 76 extends upward by a first distance, which can be measured from a bend 88A or reference surface such as the top surface 94 of the base plate 92, and the cutout extends up the bracket wall 22 from a lower edge by a second distance. With the first distance being larger than the second distance, the clamp 66 is not easily removed from the bracket support 16 with an outward movement. Then, the first or upper flange 76 is positioned in a mounting bracket 42 which limits inward and outward movement of the clamp 66 as well as vertical movement of the clamp 66 as described herein.

The mounting bracket 42 is positioned to allow the first flange 76 of the clamp 66 to be inserted through the slot 56 of the mounting bracket. This embodiment shows the mounting bracket 42 positioned so that the bolt holes 60 will align with the bottom apertures 34 of the support bracket 16 and the base plate holes 96. The mounting bracket slot 56 prevents the first flange 76 from being removed through the cutout 30 of the support bracket, as described herein. Thus, the upper or first flange 76 can be described as extending upwardly above an upper surface of the bottom portion of the support bracket 16 so that the mounting bracket can hold the clamp in place relative to the support bracket 16.

The mounting bracket 42 is then secured over the support bracket 16 to the base plate 92. In some embodiments, the mounting bracket 42 is secured to the support bracket 16 to eliminate play or movement between components of the mounting system 12. In some embodiments, a fastener extends through the oblong or elongated hole 60 in the mounting bracket, through the bottom aperture 34 of the support bracket 16, and into the hole 96 of the base plate 92. The fastener is only partially tightened which allows for some relative movement among the components of the mounting system while the mounting system is secured to a vehicle. Once the components of the mounting system are in the proper position, the mounting bracket is pushed inward toward the vehicle, then the fastener is fully tightened. This sequence of actions prevent relative movement among the components of the mounting system once the fastener is fully tightened.

While the embodiment shown in the figures depicts using bolts 118 to secure the mounting bracket 42 to the support bracket 16 and the base plate 92, other methods of attachment are possible. For example, one or more of the components of the mounting system 12 could be interconnected by other means including screws, pins, magnets, adhesives, welding, and other methods known in the art. In addition, the terms such as "bolt holes," "holes," "apertures," "slots," etc. may be used interchangeably.

With the clamp in the second angle or orientation, the lower end and the second flange 84 of the clamp 66 are rotated against the vehicle to secure the mounting system 12 to the vehicle. In some embodiments, the clamp 66 optionally has a lower flange 84 that forms an acute angle with a body portion 82 of the clamp 66 to position the clamp 66 around a projection, door jamb, or other portion of a vehicle. Optionally, the lower flange 84 may form a different angle with the body portion 82 of the clamp 66.

FIG. 9 also shows an embodiment of the support brace 38 of the support bracket 16. The support brace 38 is attached to the top portion 18 on one end and the bottom portion 28 on the opposite end. While the depicted embodiment shows that the support brace 38 is welded to the support bracket 16, other methods of attachment, for example adhesives or bolts, are contemplated. In this position, the support brace 38 adds support to the top portion 18 and prevents the top portion 18 from deflecting under the load of the roof rack 10.

Figure 10:
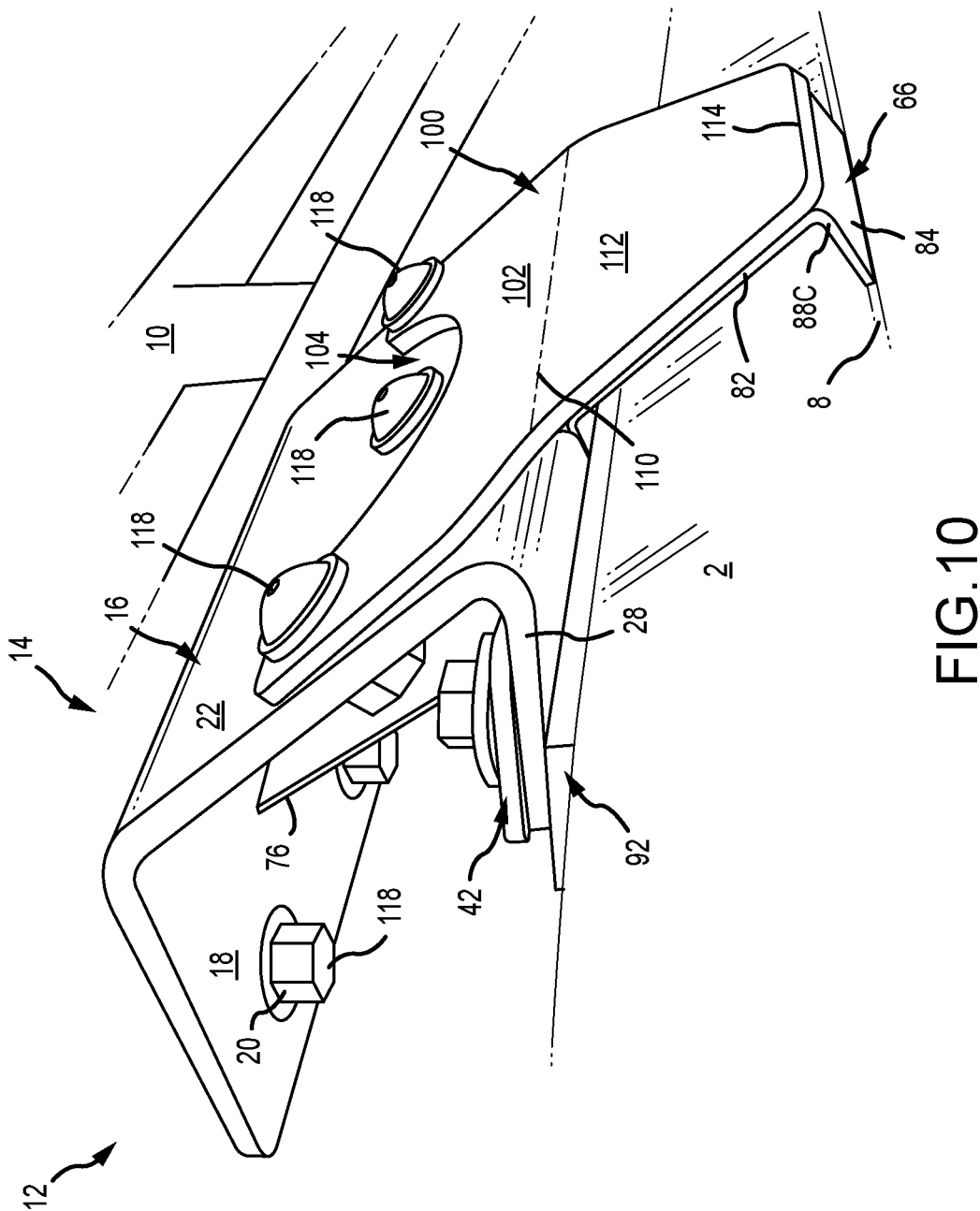
FIG. 10 is a perspective view of the mount of the mounting system in a fully assembled state.

FIG. 10 shows one embodiment of the mount 14 of the mounting system 12 fully assembled. The bottom portion 28 of the support bracket 16 is positioned between the base plate 92 and the mounting bracket 42. The clamp 66 is engaged with the door jamb 8 by the second flange 84. The clamp insert portion 80 and the first flange 76 are inserted through the slot 56 of the mounting bracket 42. In this embodiment, a bolt 118 secures the mounting bracket 42 and the bracket bottom portion 28 to the base plate 92. The roof rack 10 is also shown secured to the support bracket top portion 18 with bolts 118. However, other methods, such as screws, clamps, adhesives, and other means known in the mechanical arts are contemplated.

An embodiment of a cover plate 100 is shown attached to the bracket wall 22. The cover plate 100 is secured to the bracket wall 22 by bolts 118 which extend through the front apertures (24A, 24B) of the support bracket. The cover plate 100 has a length sufficient to extend below the bottom portion 28 of the support bracket such that the cover plate bend 110 causes the bottom section 112 of the cover plate to rest against the clamp body portion 82. When the bolts 118 through the cover plate apertures 106 are tightened, a biasing force is created by the bottom section 112 of the cover plate pushing against the clamp body portion 82. This biasing force further prevents the second flange 84 of the clamp 66 from becoming unseated from the door jamb.

In some embodiments, the cover plate cutout 104 allows a threaded fastener or a bolt 118 to be inserted through the center aperture 24C of the bracket wall 22. This bolt 118 extends through the bracket wall and contacts the first flange 76 of the clamp. This contact prevents the first flange 76 from moving and further secures the door jamb flange 84.

Figure 11:
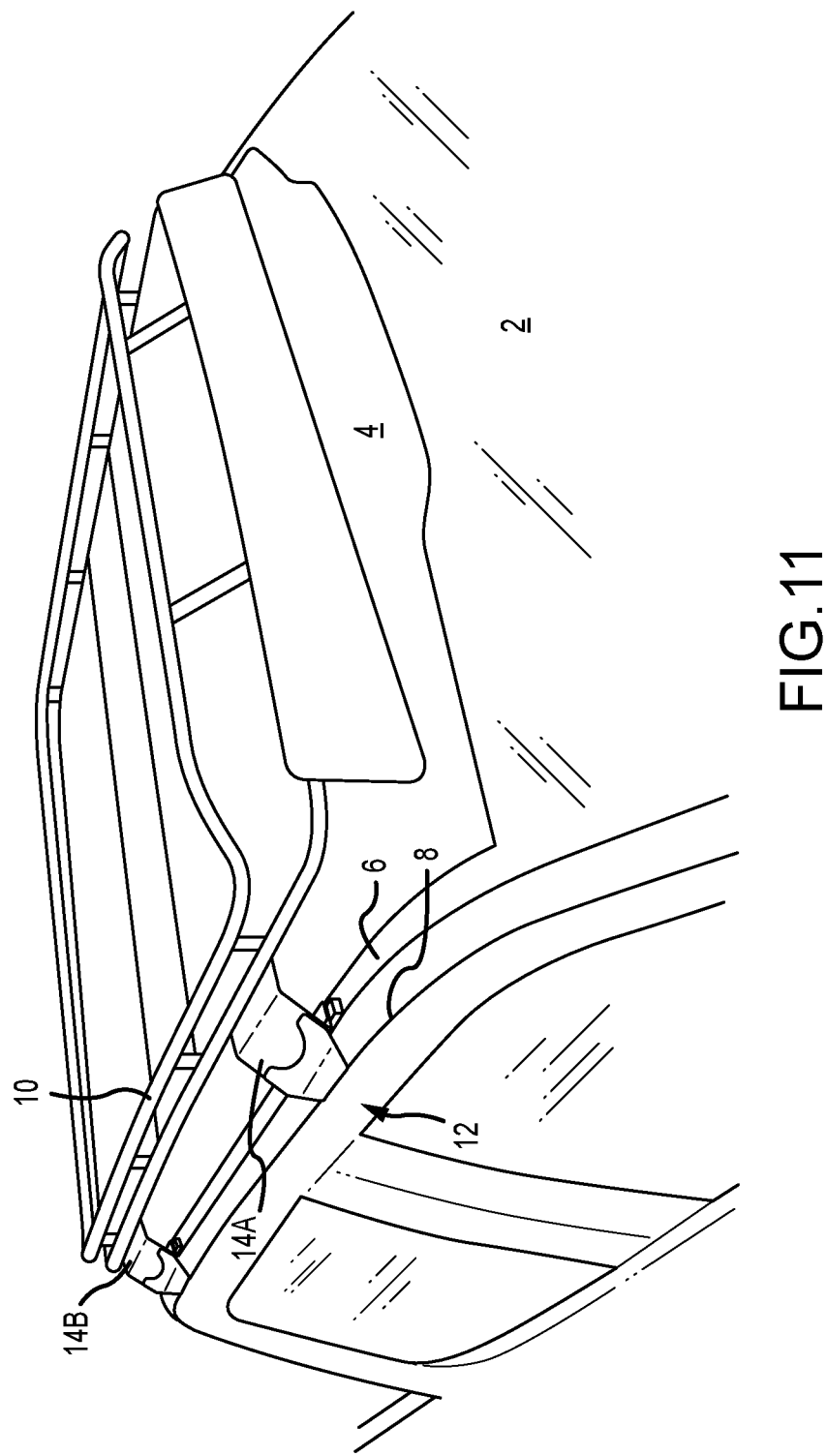
FIG. 11 is a perspective view of a roof rack interconnected to a vehicle by the mounting system of an embodiment of the present disclosure.

Referring now to FIG. 11, mounts 14 of a mounting system 12 of the present disclosure are shown interconnecting a roof rack 10 to a vehicle 2. The mounting system 12 of the present disclosure is configured for use with vehicles 2 of all types. Generally, the mounting system 12 includes four mounts 14. In one embodiment, a mount 14A is positioned over the driver and passenger door and mount 14B is positioned over the rear doors of the vehicle. Minor variations in size and configuration of the components of the mounting system 12 may be present to accommodate the configuration of a vehicle and variations that may occur along the length of a vehicle. Although minor variations may exist between the driver and passenger side, as well as the front and back doors, the general structure disclosed in the description below and in the figures is the same for each system.

While various embodiments of the system have been described in detail, it is apparent that modifications and alterations of those embodiments will occur to those skilled in the art. It is to be expressly understood that such modifications and alterations are within the scope and spirit of the present disclosure. Further, it is to be understood that the phraseology and terminology used herein is for the purposes of description and should not be regarded as limiting. The use of "including," "comprising," or "having" and variations thereof herein are meant to encompass the items listed thereafter and equivalents thereof, as well as, additional items.

What is claimed is:

1. An apparatus for securing a roof rack to a vehicle, comprising:
a support bracket having a cutout portion and having a bottom portion joined to a bracket wall, wherein the bottom portion has a first aperture, and the support bracket is configured to engage the roof rack;
a clamp having a bottom flange joined to a body portion and having the body portion joined to an insert portion, wherein the bottom flange and the body portion form an acute angle on an inner surface of the clamp such that the bottom flange is configured to be secured to the vehicle, wherein the body portion and the insert portion form an obtuse angle on the inner surface of the clamp such that the insert portion selectively extends through the cutout portion of the support bracket; and
a mounting bracket selectively positioned on top of an upper surface of the bottom portion of the support bracket and on top of the insert portion of the clamp, the mounting bracket having a second aperture that is configured to receive a first fastener that selectively extends into the first and second apertures to secure the mounting bracket to the support bracket and to secure the clamp to the support bracket.

2. The apparatus of claim 1, further comprising:
an upper flange joined to the insert portion of the clamp, wherein the upper flange and the insert portion form an acute angle on an outer surface of the clamp; and
a slot extending through the mounting bracket, wherein a width of the slot is larger than a width of the upper flange of the clamp such that the upper flange may extend through the slot when the mounting bracket is secured to the support bracket.

3. The apparatus of claim 2, further comprising a third aperture in the bracket wall of the support bracket, wherein the third aperture is configured to receive a second fastener that selectively contacts the upper flange of the clamp to put the upper flange in tension with the insert portion of the clamp.

4. The apparatus of claim 1, further comprising a projection extending from a bottom surface of the mounting bracket, wherein the projection selectively contacts the insert portion of the clamp as the mounting bracket is secured to the support bracket to secure the clamp to the support bracket.

5. The apparatus of claim 1, further comprising:
a fourth aperture extending through the bracket wall of the support bracket; and
a cover having a fifth aperture that is configured to receive a third fastener that selectively extends through the fourth and fifth apertures to secure the cover to the support bracket such that a lower end of the cover contacts the body portion of the clamp.

6. The apparatus of claim 1, wherein the second aperture of the mounting bracket is elongated such that a position of the mounting bracket can be adjusted relative to the bracket wall of the support bracket.

7. The apparatus of claim 1, further comprising a base plate selectively positioned against a lower surface of the bottom portion of the support bracket and configured to receive the first fastener to secure the support bracket to the base plate.

8. A method of constructing an apparatus for securing a roof rack to a vehicle, comprising:
bending a support bracket to form an acute angle between a bottom portion and a bracket wall on an inner surface of the support bracket, wherein the bottom portion has a first aperture;
forming a cutout portion extending through the support bracket;
bending a clamp to form an acute angle between a bottom flange and a body portion on an inner surface of the clamp such that the bottom flange is configured to be secured to the vehicle;
bending the clamp to form an obtuse angle between the body portion and an insert portion on the inner surface of the clamp such that the insert portion is configured to be extended through the cutout portion of the support bracket; and
forming a second aperture in a mounting bracket such that the mounting bracket is configured to be positioned on top of an upper surface of the bottom portion of the support bracket and on top of the insert portion of the clamp and is configured to be secured by a fastener that selectively extends through the first and second apertures to secure the mounting bracket to the support bracket and to secure the clamp to the mounting bracket.

9. The method of claim 8, further comprising:
bending the clamp to form an acute angle between the insert portion and an upper flange on an outer surface of the support bracket; and
forming a slot in the mounting bracket that is wider than the upper flange such that the upper flange is configured to extend through the slot as the mounting bracket is secured to the support bracket.

10. The method of claim 9, further comprising:
inserting part of the clamp through the cutout portion of the support bracket at a first angle; and
rotating the clamp to a second angle that is distinct from the first angle to position the bottom flange of the clamp against a door jamb of the vehicle.

11. The method of claim 8, further comprising:
forming the second aperture in the mounting bracket with an elongated configuration;
extending the fastener through the first and second apertures as the clamp is positioned through the cutout portion of the support bracket; and
moving the mounting bracket inwardly and further extending the fastener through the first and second apertures to secure the mounting bracket to the support bracket and to secure the clamp to the mounting bracket.

12. The method of claim 8, further comprising:
bending the support bracket to form an obtuse angle between the bracket wall and a top portion on the inner surface of the support bracket; and
securing the roof rack to the top portion of the support bracket.

13. A system for securing a roof rack to a vehicle, comprising:
a support bracket configured to engage the roof rack, comprising:
a bracket wall;
a bottom portion joined to the bracket wall; and
a cutout portion extending through the bracket wall and extending upwardly from a bottom edge of the bracket wall by a first distance;
a clamp, comprising:
a body portion;
an insert portion joined to the body portion, wherein the body portion and the insert portion form an obtuse angle on an inner surface of the clamp; and
an upper flange joined to the insert portion, wherein the insert portion and the upper flange form an acute angle on an outer surface of the clamp, wherein the upper flange extends upwardly from the insert portion by a second distance that is larger than the first distance, and wherein the upper flange and the insert portion are insertable through the cutout portion of the support bracket; and
a mounting bracket having a slot that is wider than the upper flange of the clamp, wherein the upper flange at least partially extends into the slot as the mounting bracket is positioned over the clamp and secured to the bottom portion of the support bracket to limit movement of the clamp relative to the support bracket.

14. The system of claim 13, further comprising:

a base plate positionable on a roof of the vehicle, wherein a fastener selectively secures the mounting bracket to the support bracket and secures the support bracket to the base plate such that a portion of the vehicle is secured between the base plate and a lower end of the clamp.

15. The system of claim 13, further comprising:

a top portion joined to the bracket wall of the support bracket, wherein the top portion is configured to engage the roof rack; and a support brace extending from the top portion to the bottom portion of the support bracket.

16. The system of claim 15, further comprising:

a notch extending into an outer edge of the mounting bracket, wherein the support brace at least partially extends into the notch when the mounting bracket is secured to the bottom portion of the support brace.

17. The system of claim 13, further comprising a fastener selectively extendable through an aperture in the bracket wall of the support bracket to contact the upper flange of the clamp to place the upper flange in tension with the insert portion of the clamp.

18. The system of claim 13, further comprising a cover selectively connected to the bracket wall of the support bracket, wherein the cover comprises a top section joined to a bottom section, and the top and bottom sections form an obtuse angle on an inner surface of the cover, wherein a lower portion of the bottom section contacts the outer surface of the clamp to secure the clamp to the support bracket.

19. The system of claim 13, further comprising a bottom flange joined to the body portion of the clamp and forming an acute angle with the body portion on the inner surface of the clamp, wherein the bottom flange is configured to engage a portion of the vehicle.

20. The system of claim 13, wherein an outer width of the mounting bracket is larger than a width of the cutout portion of the support bracket such that the mounting bracket is positionable over the cutout portion as the mounting bracket is secured to the support bracket.

* * * * *